United States Patent
Nakayama et al.

(10) Patent No.: US 10,216,349 B2
(45) Date of Patent: Feb. 26, 2019

(54) TOUCH PANEL, CONDUCTIVE SHEET FOR TOUCH PANEL, AND TOUCH SENSOR

(71) Applicant: FUJIFILM Corporation, Tokyo (JP)

(72) Inventors: Masaya Nakayama, Ashigarakami-gun (JP); Tadashi Kuriki, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/993,065

(22) Filed: May 30, 2018

(65) Prior Publication Data

US 2018/0275801 A1 Sep. 27, 2018

Related U.S. Application Data

(63) Continuation of application No. PCT/JP2018/003024, filed on Jan. 30, 2018.

(30) Foreign Application Priority Data

Mar. 6, 2017 (JP) .................. 2017-041463

(51) Int. Cl.
*G06F 3/044* (2006.01)
*G06F 3/047* (2006.01)

(52) U.S. Cl.
CPC .............. *G06F 3/044* (2013.01); *G06F 3/047* (2013.01); *G06F 2203/04103* (2013.01)

(58) Field of Classification Search
CPC . G06F 3/044; G06F 3/047; G06F 2203/04103
See application file for complete search history.

(56) References Cited

U.S. PATENT DOCUMENTS

2013/0222328 A1* 8/2013 Cok .................. G06F 3/044
345/174
2014/0293158 A1 10/2014 Kurasawa et al.
(Continued)

FOREIGN PATENT DOCUMENTS

| JP | 2014-191660 A | 10/2014 |
|----|---------------|---------|
| JP | 2015-191406 A | 11/2015 |
| WO | WO 2016/084449 A1 | 6/2016 |

OTHER PUBLICATIONS

International Search Report (PCT/ISA/210) issued in PCT/JP2018/003024, dated Mar. 6, 2018.
(Continued)

*Primary Examiner* — Mihir K Rayan
(74) *Attorney, Agent, or Firm* — Birch, Stewart, Kolasch & Birch, LLP

(57) ABSTRACT

A touch panel has a transparent insulating member, a first electrode layer, and a second electrode layer, in which in a case where a total area of first non-connecting wires in a first electrode of the first electrode layer is A1, a total area of first electrode wires in the first electrode is B1, and an occupation ratio of the first non-connecting wires in the first electrode is C1, C1=A1/(A1+B1) is satisfied, in a case where a total area of second non-connecting wires in a second electrode of the second electrode layer is A2, a total area of second electrode wires in the second electrode is B2, and an occupation ratio of the second non-connecting wires in the second electrode is C2, C2=A2/(A2+B2) is satisfied, and at least one first electrode and at least one second electrode satisfying C2<C1 are provided.

20 Claims, 21 Drawing Sheets

(56) References Cited

U.S. PATENT DOCUMENTS

| | | | | |
|---|---|---|---|---|
| 2016/0018931 A1* | 1/2016 | Kurasawa | ............... | G06F 3/044 |
| | | | | 345/174 |
| 2016/0026298 A1* | 1/2016 | Hashida | .................... | G06F 1/16 |
| | | | | 345/174 |
| 2016/0103526 A1* | 4/2016 | Sohn | ........................ | G06F 3/044 |
| | | | | 345/174 |
| 2016/0320879 A1* | 11/2016 | Hashida | .................. | G06F 3/044 |
| 2017/0102804 A1* | 4/2017 | Kikukawa | ............... | G06F 3/041 |
| 2017/0228052 A1* | 8/2017 | Nakamura | .......... | G06F 3/03545 |
| 2018/0120971 A1* | 5/2018 | Lee | ........................ | G06F 3/045 |

OTHER PUBLICATIONS

Written Opinion (PCT/ISA/237) issued in PCT/JP2018/003024, dated Mar. 6, 2018.
Korean Office Action dated Dec. 20, 2018 (with English translation), issued in corresponding Korean Patent Application No. KR 10-2018-7016105.

* cited by examiner

TOUCH PANEL, CONDUCTIVE SHEET FOR TOUCH PANEL, AND TOUCH SENSOR

CROSS-REFERENCE TO RELATED APPLICATIONS

This application is a Continuation of PCT International Application No. PCT/JP2018/3024, filed on Jan. 30, 2018, which claims priority under 35 U.S.C. § 119(a) to Japanese Patent Application No. 2017-041463, filed on Mar. 6, 2017. Each of the above application(s) is hereby expressly incorporated by reference, in its entirety, into the present application.

BACKGROUND OF THE INVENTION

1. Field of the Invention

The present invention relates to a touch panel that is disposed on a display panel and used as a touch sensor, and a conductive sheet for a touch panel that is used for the touch panel, and particularly, to a touch panel in which detection sensitivity for touch detection is adjusted, and a conductive sheet for a touch panel that is used for the touch panel.

2. Description of the Related Art

Currently, the resistance of a detection electrode that detects a touch can be reduced in electrostatic capacitance-type touch panels using thin metallic wires. Accordingly, it is possible to provide touch panels capable of performing detection related not only to a finger but also to even a member such as a stylus pen with a fine tip end that is finer than the finger, and thus the above touch panels have attracted attention.

For example, JP2015-191406A discloses that it is possible to provide a high-sensitivity touch panel in which an initial value of electrostatic capacitance between electrodes is adjusted by providing a non-connecting wire that is not connected to a pad in an electrode formed of electrode wires.

SUMMARY OF THE INVENTION

However, in the touch panel disclosed in JP2015-191406A, erroneous detection is not generated in the detection of a touch by a finger, but there is a problem in that erroneous detection may be generated in the detection of a touch by a member with a tip end that is finer than a finger.

An object of the invention is to provide a touch panel and a conductive sheet for a touch panel that can solve the problems based on the related art and in which erroneous detection can be suppressed even in the detection of a touch by a member with a tip end that is finer than a finger.

In order to achieve the above-described object, the invention provides a touch panel comprising: a transparent insulating member; a first electrode layer that is positioned on a first surface of the transparent insulating member; and a second electrode layer that is positioned on a second surface opposed to the first surface of the transparent insulating member, in which the first surface is on a contact detection side, the first electrode layer is provided with a plurality of first electrodes that are disposed at intervals in a first direction and extend in a second direction perpendicular to the first direction, the first electrode has a plurality of first electrode wires, a first pad to which the plurality of first electrode wires are electrically connected, and a plurality of first non-connecting wires that are not electrically connected to the first electrode wires, the second electrode layer is provided with a plurality of second electrodes that are disposed at intervals in the second direction and extend in the first direction, the second electrode has a plurality of second electrode wires, a second pad to which the plurality of second electrode wires are electrically connected, and a plurality of second non-connecting wires that are not electrically connected to the second electrode wires, in a case where a total area of the first non-connecting wires in the first electrode is indicated by A1, a total area of the first electrode wires in the first electrode is indicated by B1, and an occupation ratio of the first non-connecting wires in the first electrode is indicated by C1, $C1=A1/(A1+B1)$ is satisfied, in a case where a total area of the second non-connecting wires in the second electrode is indicated by A2, a total area of the second electrode wires in the second electrode is indicated by B2, and an occupation ratio of the second non-connecting wires in the second electrode is indicated by C2, $C2=A2/(A2+B2)$ is satisfied, and at least one first electrode and at least one second electrode satisfying $C2<C1$ are provided.

It is preferable that in a sensing region where the first electrode layer and the second electrode layer of the transparent insulating member are provided, the occupation ratio C1 of the first non-connecting wires and the occupation ratio C2 of the second non-connecting wires satisfy $C2<C1$.

It is preferable that the occupation ratio C1 of the first non-connecting wires and the occupation ratio C2 of the second non-connecting wires satisfy $1.0<C1/C2\leq3.0$. It is more preferable that the occupation ratio C1 of the first non-connecting wires and the occupation ratio C2 of the second non-connecting wires satisfy $1.2\leq C1/C2\leq2.0$.

It is preferable that the first electrode and the second electrode have the same electrode width.

It is preferable that in a case where an area of the first electrode is indicated by E1 and an area of the second electrode is indicated by E2, the total area A1 of the first non-connecting wires, the total area B1 of the first electrode wires, the area E1 of the first electrode, the total area A2 of the second non-connecting wires, the total area B2 of the second electrode wires, and the area E2 of the second electrode satisfy $0.9<((A1+B1)/E1)/((A2+B2)/E2)<1.1$.

It is preferable that the first electrode wire, the first non-connecting wire, the second electrode wire, and the second non-connecting wire have a wire width of 10 μm or less.

It is preferable that the first electrode wire, the first non-connecting wire, the second electrode wire, and the second non-connecting wire have the same wire width, and that the wire width is 5 μm or less.

The invention provides a conductive sheet for a touch panel comprising: a transparent insulating member; a first electrode layer that is positioned on a first surface of the transparent insulating member; and a second electrode layer that is positioned on a second surface opposed to the first surface of the transparent insulating member, in which the first electrode layer is provided with a plurality of first electrodes that are disposed at intervals in a first direction and extend in a second direction perpendicular to the first direction, the first electrode has a plurality of first electrode wires, a first pad to which the plurality of first electrode wires are electrically connected, and a plurality of first non-connecting wires that are not electrically connected to the first electrode wires, the second electrode layer is provided with a plurality of second electrodes that are disposed at intervals in the second direction and extend in the first direction, the second electrode has a plurality of second electrode wires, a second pad to which the plurality of second electrode wires are electrically connected, and a plurality of second non-connecting wires that are not electrically connected to the second electrode wires, in a case where a total area of the first non-connecting wires in the first electrode is indicated by A1, a total area of the first electrode wires in the first electrode is indicated by B1, and an occupation ratio of the first non-connecting wires in the first electrode is indicated by C1, C1=A1/(A1+B1) is satisfied, in a case where a total area of the second non-connecting wires in the second electrode is indicated by A2, a total area of the second electrode wires in the second electrode is indicated by B2, and an occupation ratio of the second non-connecting wires in the second electrode is indicated by C2, C2=A2/(A2+B2) is satisfied, and at least one first electrode and at least one second electrode satisfying C2<C1 are provided.

A conductive sheet for a touch panel may comprise: a transparent insulating member; a first electrode layer; and a second electrode layer, and the first electrode layer and the second electrode layer may be opposed to each other with the transparent insulating member interposed therebetween.

The invention also relates to a touch sensor comprising the conductive sheet for a touch panel.

A display device may have a display panel and the conductive sheet for a touch panel, and the first electrode layer, the transparent insulating member, and the second electrode layer in the conductive sheet for a touch panel, and the display panel may be laminated in this order.

According to the invention, it is possible to suppress erroneous detection even in the detection of a touch by a member with a tip end that is finer than a finger.

DESCRIPTION OF THE PREFERRED EMBODIMENTS

Hereinafter, a touch panel and a conductive sheet for a touch panel according to the invention will be described in detail based on preferable embodiments illustrated in the accompanying drawings.

In the following description, the expression "to" indicating a numerical value range includes numerical values on both sides of "to". For example, in a case where ε is a numerical value α to a numerical value β, the range of ε includes the numerical values α and β, and is expressed as $\alpha \leq \varepsilon \leq \beta$ using mathematical symbols.

An angle expressed using the expression such as an "angle represented by a concrete numerical value", "parallel", "vertical", or "perpendicular" includes an error range that is generally permitted in the corresponding technical field unless otherwise noted.

The expression "the same" includes an error range that is generally permitted in the technical field unless otherwise noted.

The expression transparent means that the light transmittance is 40% or greater, preferably 80% or greater, and more preferably 90% or greater in a visible light wavelength range ranging from 380 to 780 nm.

The light transmittance is measured using, for example, "Plastics—Determination of Total Luminous Transmittance and Reflectance" specified in JIS (Japanese Industrial Standards) K 7375: 2008.

Figure 1:
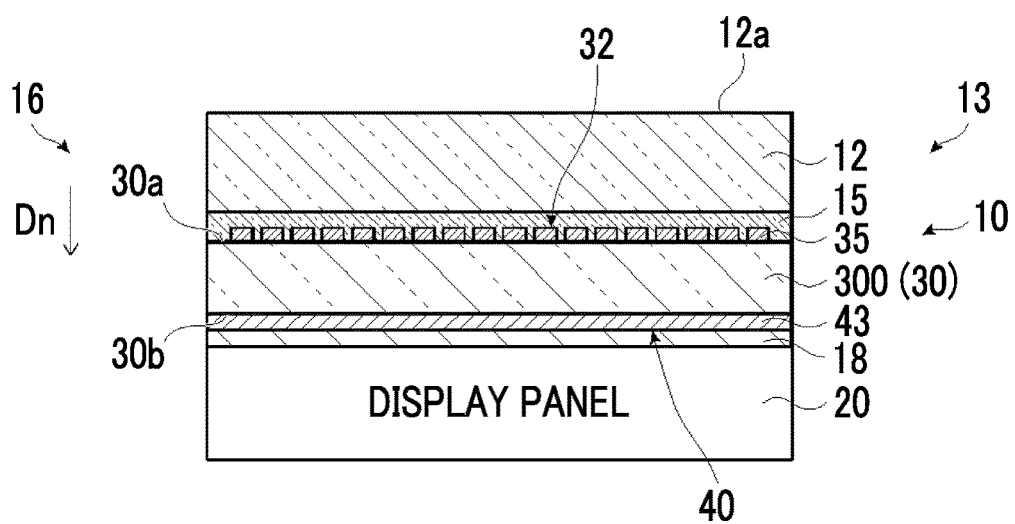
FIG. 1 is a cross-sectional view schematically illustrating a configuration of a touch panel according to an embodiment of the invention.
Figure 2:
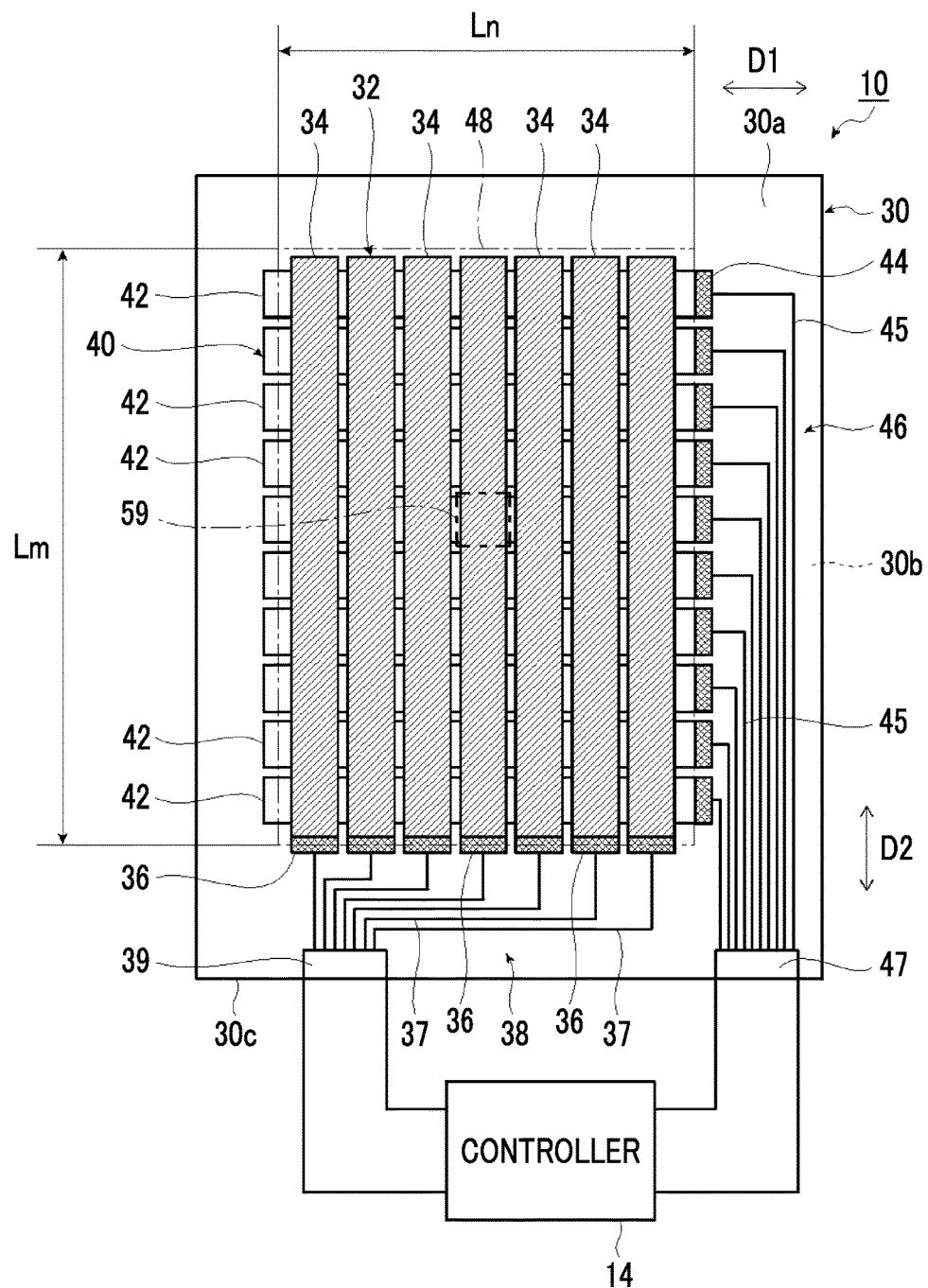
FIG. 2 is a plan view schematically illustrating the touch panel according to the embodiment of the invention.
Figure 3:
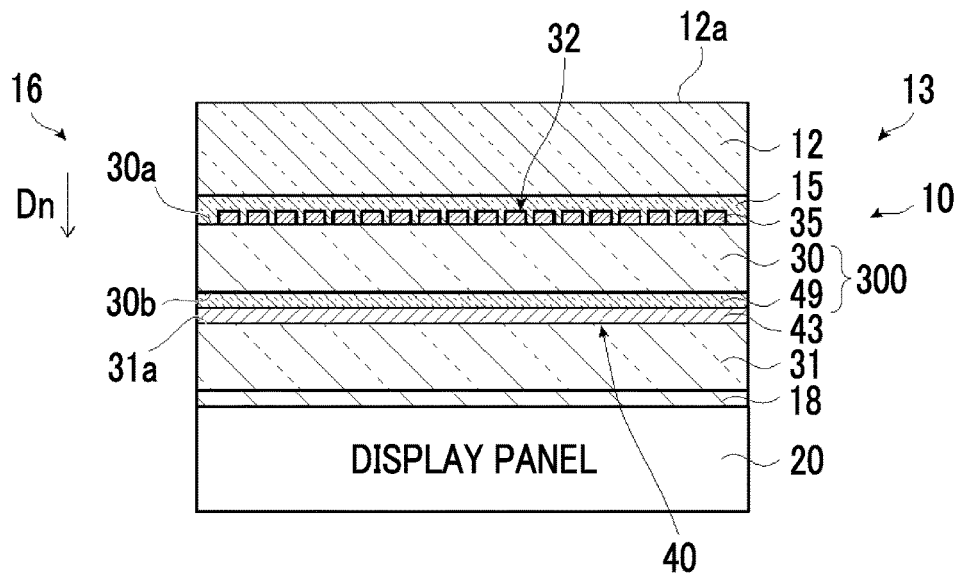
FIG. 3 is a cross-sectional view schematically illustrating another example of the configuration of the touch panel according to an embodiment of the invention.
Figure 4:
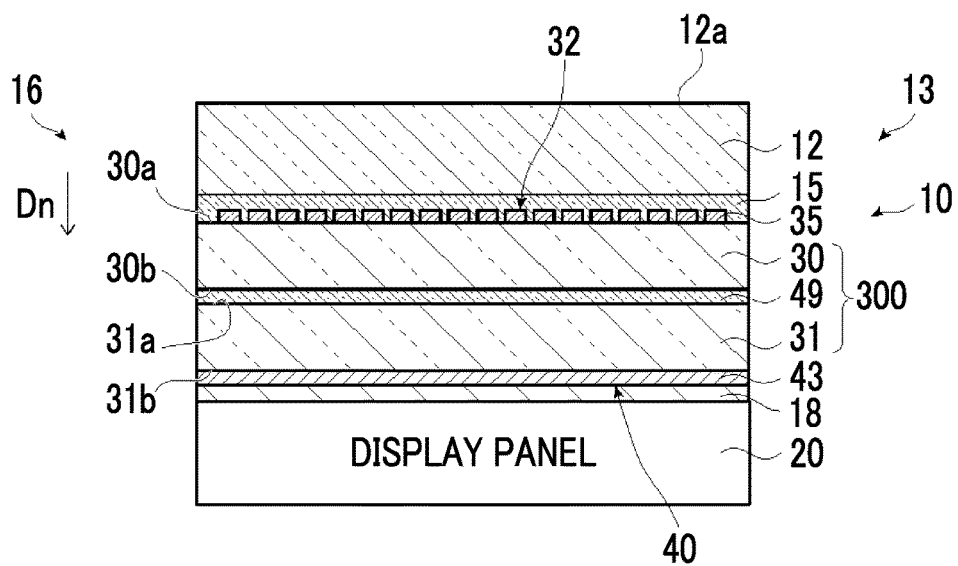
FIG. 4 is a cross-sectional view schematically illustrating a further example of the configuration of the touch panel according to an embodiment of the invention.

FIG. 1 is a cross-sectional view schematically illustrating a configuration of a touch panel according to an embodiment of the invention. FIG. 2 is a plan view schematically illustrating the touch panel according to the embodiment of the invention. FIGS. 3 and 4 are cross-sectional views schematically illustrating other examples of the configuration of the touch panel according to an embodiment of the invention.

As illustrated in FIG. 1, for example, a conductive sheet 10 for a touch panel as a conductive member is provided on a display panel 20 via, for example, a transparent layer 18.

A cover layer 12 is provided on the conductive sheet 10 for a touch panel via a transparent layer 15. The conductive sheet 10 for a touch panel is connected to a controller 14 (see FIG. 2).

The conductive sheet 10 for a touch panel and the cover layer 12 form a touch sensor 13, and the conductive sheet 10 for a touch panel, the cover layer 12, and the controller 14 form a touch panel 16. The touch panel 16 and the display panel 20 form a display device that is an electronic device. The electronic device is not limited to the above-described display device.

A front surface 12a of the cover layer 12 serves as a surface where a display object displayed in a display region (not shown) of the display panel 20 is visually recognized. In addition, the front surface 12a of the cover layer 12 serves as a touch face of the touch panel 16, and as an operation face. The touch face refers to a face that detects a contact of a finger, a stylus pen, or the like.

The controller 14 is formed of a known controller that is used for the detection of an electrostatic capacitance-type touch sensor. In the touch panel 16, the controller 14 detects a position where the electrostatic capacity changes due to a contact of a finger or the like to the front surface 12a of the cover layer 12. As a detecting method of an electrostatic capacitance-type touch panel, a known detecting method can be properly used.

As described above, the touch panel 16 includes the conductive sheet 10 for a touch panel. Particularly, the touch panel 16 including the conductive sheet 10 for a touch panel is most suitable as a mutual capacitance-type touch panel. Electrostatic capacitance-type touch panels include mutual capacitance-type touch panels and self-capacitance-type touch panels, and the above touch panel is particularly most suitable as a mutual capacitance-type.

The cover layer 12 is a layer for protecting the conductive sheet 10 for a touch panel. The configuration of the cover layer 12 is not particularly limited. For example, glass such as plate glass or reinforced glass, or an acrylic resin such as polycarbonate (PC), polyethylene terephthalate (PET), or a polymethylmethacrylate resin (PMMA) is used as the cover layer 12. Since the front surface 12a of the cover layer 12 serves as a touch face as described above, a hard coat layer may be provided on the front surface 12a as necessary. The thickness of the cover layer 12 is 0.1 to 1.3 mm, and is particularly preferably 0.1 to 0.7 mm.

The transparent layer 18 is optically transparent and has an insulating property. In addition, the configuration thereof is not particularly limited as long as the transparent layer can stably fix the conductive sheet 10 for a touch panel and the display panel 20. As the transparent layer 18, for example, an optically transparent pressure sensitive adhesive (optical clear adhesive, OCA) or an optically transparent resin (optical clear resin, OCR) such as an ultraviolet (UV) curable resin can be used. The transparent layer 18 may be partially hollow.

A configuration may also be employed in which the conductive sheet 10 for a touch panel is provided on the display panel 20 with a gap therebetween without the transparent layer 18. The gap is also referred to as an air gap.

In addition, the transparent layer 15 is optically transparent and has an insulating property. In addition, the configuration thereof is not particularly limited as long as the transparent layer can stably fix the conductive sheet 10 for a touch panel and the cover layer 12. The same one as the transparent layer 18 can be used as the transparent layer 15.

The display panel 20 is provided with a display region (not shown), and is, for example, a liquid crystal display panel. The display panel 20 is not limited to a liquid crystal display panel, and may be an organic electroluminescence (EL) display panel.

The electronic device has the conductive sheet 10 for a touch panel or the touch panel 16, and is not particularly limited as long as it has the conductive sheet 10 for a touch panel or the touch panel 16. Examples of the electronic device include the above-described display device. Specific examples of the electronic device include cellular phones, smartphones, portable information terminals, car navigation systems, tablet terminals, notebook personal computers, and desktop personal computers.

The conductive sheet 10 for a touch panel is used for, for example, an electrostatic capacitance-type touch sensor.

In the conductive sheet 10 for a touch panel as a conductive member, a first electrode layer 32 and a second electrode layer 40 are disposed to be opposed to each other in an insulated state, and a transparent insulating member 300 is used in the conductive sheet 10 for a touch panel. In the conductive sheet 10 for a touch panel, specifically, a transparent insulating base 30 can be used as the transparent insulating member 300, and the first electrode layer 32 having a plurality of first electrode wires 35 is provided on a front surface 30a of the transparent insulating base 30 as illustrated in FIG. 1. In addition, the second electrode layer 40 having a plurality of second electrode wires 43 is provided on a rear surface 30b of the transparent insulating base 30. FIG. 1 illustrates a configuration in which the first electrode layer 32 and the second electrode layer 40 are directly formed on the front surface 30a and the rear surface 30b of the transparent insulating base 30, respectively, but at least one underlayer (under coat layer) or adhesion reinforcing layer for enhancing adhesion between the electrode layer and the transparent insulating base, or at least another functional layer may be provided between the transparent insulating base 30 and the first electrode layer 32 and between the transparent insulating base 30 and the second electrode layer 40.

The front surface 30a of the transparent insulating base 30 is a first surface, and the rear surface 30b of the transparent insulating base 30 is a second surface opposed to the first surface. The cover layer 12 is laminated on the front surface 30a of the transparent insulating base 30, and the front surface 30a of the transparent insulating base 30 is on the touch face side, that is, on the contact detection side. That is, the first surface is on the touch face side, that is, on the contact detection side.

As illustrated in FIG. 2, the first electrode layer 32 is provided with a plurality of first electrodes 34. The plurality of first electrodes 34 are disposed at intervals in a first direction D1 and extend in a second direction D2 perpendicular to the first direction D1. In the example of FIG. 2, the first electrode 34 is a long electrode.

The first electrode 34 has a plurality of first electrode wires 35 and a first pad 36 to which the plurality of first electrode wires 35 are electrically connected at intervals. The first electrode wire 35 is formed of a thin metallic wire having a wire width of 10 μm or less as will be described in detail later.

Regarding the plurality of first electrodes 34, a first peripheral wire 37 is electrically connected to the first pad 36 of each first electrode 34. The first peripheral wires 37 are arranged close to each other, and the plurality of first peripheral wires 37 are individually connected to respective terminals for connection to the controller 14. These terminals are collected in one terminal connection region 39 at one side 30c of the transparent insulating base 30. The plurality of first peripheral wires 37 are collectively referred to as a first peripheral wiring portion 38.

As illustrated in FIG. 2, the second electrode layer 40 is provided with a plurality of second electrodes 42. The plurality of second electrodes 42 are disposed at intervals in the second direction D2 and extend in the first direction D1. In the example of FIG. 2, the second electrode 42 is a long electrode.

The second electrode 42 has a plurality of second electrode wires 43 and a second pad 44 to which the plurality of second electrode wires 43 are electrically connected at intervals. The second electrode wire 43 is formed of a thin metallic wire having a wire width of 10 or less as will be described in detail later.

Regarding the plurality of second electrodes 42, a second peripheral wire 45 is electrically connected to the second pad 44 of each second electrode 42. The second peripheral wires 45 are arranged close to each other. The plurality of second peripheral wires 45 are individually connected to respective terminals for connection to the controller 14, and these terminals are collected in one terminal connection region 47 at one side 30c of the transparent insulating base 30. The plurality of second peripheral wires 45 are collectively referred to as a second peripheral wiring portion 46.

The first electrode 34 and the second electrode 42 are insulated by the transparent insulating member 300, and disposed so as to at least partially overlap and intersect with each other. Specifically, when viewed in a direction Dn (see FIG. 3) vertical to one surface of the transparent insulating base 30, the second electrode 42 is disposed so as to at least partially overlap and intersect with the first electrode 34. The lamination direction in which the first electrode 34 and the second electrode 42 are overlapped is the same as the vertical direction Dn (see FIG. 1). A sensing region 48 illustrated in FIG. 2 that detects a touch is formed in a region where the plurality of first electrodes 34 and the plurality of second electrodes 42 are provided. The sensing region 48 serves as a sensor region.

The plurality of first electrodes 34 preferably have the same configuration in order to uniformize the detection sensitivity even in any configuration to be described later. The plurality of second electrodes 42 preferably also have the same configuration in order to uniformize the detection sensitivity even in any configuration to be described later. The outermost first electrode 34 may have a configuration different from those of other first electrodes. The outermost second electrode 42 may also have a configuration different from those of other second electrodes 42. For example, the electrode shape or the electrode width may be different.

As illustrated in FIG. 1, by providing the first electrodes 34 on the front surface 30a of one transparent insulating base 30 and proving the second electrodes 42 on the rear surface 30b, a deviation in the positional relation between the first electrodes 34 and the second electrodes 42 can be reduced even in a case where the transparent insulating base 30 contracts.

Each of the first peripheral wire 37 and the second peripheral wire 45 is formed of, for example, a conductor wire. The constituent members of the touch panel 16 including the conductive sheet 10 for a touch panel will be described in detail later.

In the conductive sheet 10 for a touch panel, the region where the plurality of first electrodes 34 and the plurality of second electrodes 42 are disposed to overlap in plan view via the transparent insulating member 300 (transparent insulating base 30 in FIG. 1) is the sensing region 48. The sensing region 48 is a sensing region capable of detecting a contact of a finger or the like, that is, a touch in an electrostatic capacitance-type touch panel. The conductive sheet 10 for a touch panel is disposed on the display panel 20 such that the sensing region 48 is overlapped on the display region of the display panel 20. Therefore, the sensing region 48 is also a visible region. The sensing region 48 serves as an image display region in a case where an image is displayed on the display region of the display panel 20 (see FIG. 1).

For example, a decorative layer (not shown) having a light shielding function is provided in a region where the first peripheral wiring portion 38 and the second peripheral wiring portion 46 are formed. The first peripheral wiring portion 38 and the second peripheral wiring portion 46 are made invisible by covering the first peripheral wiring portion 38 and the second peripheral wiring portion 46 with the decorative layer.

The configuration of the decorative layer is not particularly limited as long as the decorative layer can make the first peripheral wiring portion 38 and the second peripheral wiring portion 46 invisible, and a known decorative layer can be used. For forming the decorative layer, various printing methods such as a screen printing method, a gravure printing method, and an offset printing method, transfer methods, and vapor deposition methods can be used, and the decorative layer may be formed on the cover layer 12 or the conductive sheet 10 for a touch panel.

The conductive sheet 10 for a touch panel is not particularly limited to the configuration illustrated in FIGS. 1 and 2. For example, as in conductive sheets 10 for a touch panel illustrated in FIGS. 3 and 4, a configuration may also be employed in which a first electrode layer 32 is provided on one transparent insulating base 30 and a second electrode layer 40 is provided on another different transparent insulating base 31. The conductive sheet 10 for a touch panel may have a configuration in which a transparent insulating base 31 having a second electrode layer 40 provided on a front surface 31a via a transparent adhesive layer 49 is laminated on a rear surface 30b of one transparent insulating base 30 having a first electrode layer 32 provided on a front surface 30a of the transparent insulating base 30 as illustrated in FIG. 3. In addition, a configuration may also be employed in which a transparent insulating base 31 having a second electrode layer 40 provided on a rear surface 31b via a transparent adhesive layer 49 is laminated on a rear surface 30b of one transparent insulating base 30 having a first electrode layer 32 provided on a front surface 30a of the transparent insulating base 30 as illustrated in FIG. 4. That is, a structure having a first electrode layer 32 that is positioned on a first surface of a transparent insulating member 300 and a second electrode layer 40 that is positioned on a second surface opposed to the first surface of the transparent insulating member 300, that is, a structure in which the first electrode layer 32 and the second electrode layer 40 are insulated by the transparent insulating member 300 may be employed. In FIG. 3, the transparent insulating base 30 and the transparent adhesive layer 49 form the transparent insulating member 300, and in FIG. 4, the transparent insulating base 30, the transparent adhesive layer 49, and the transparent insulating base 31 form the transparent insulating member 300. The front surface 30a of the transparent insulating base 30 is on the touch face side in any one of the configuration illustrated in FIG. 3 and the configuration illustrated in FIG. 4. That is, the first electrode layer 32 is disposed closer to the touch face side, that is, the contact detection side than the second electrode layer 40.

Although not illustrated in the drawing, a configuration (single-side lamination configuration) may also be employed in which a first electrode layer 32 and a second electrode layer 40 are laminated on a transparent insulating base 30 via an insulating film. In this case, the insulating film corresponds to the transparent insulating member 300, and the first electrode layer 32 is disposed on the touch face side, that is, on the contact detection side.

The transparent insulating base 31 may have the same configuration as the transparent insulating base 30, or may have a different configuration. The same one as the above-described transparent layer 18 can be used as the transparent adhesive layer 49. In any one of the configuration illustrated in FIG. 3 and the configuration illustrated in FIG. 4, the lamination direction in which the first electrode 34 and the second electrode 42 are overlapped is the same as the vertical direction Dn.

Next, the first electrode layer and the second electrode layer of the conductive sheet for a touch panel will be described.

Figure 5:
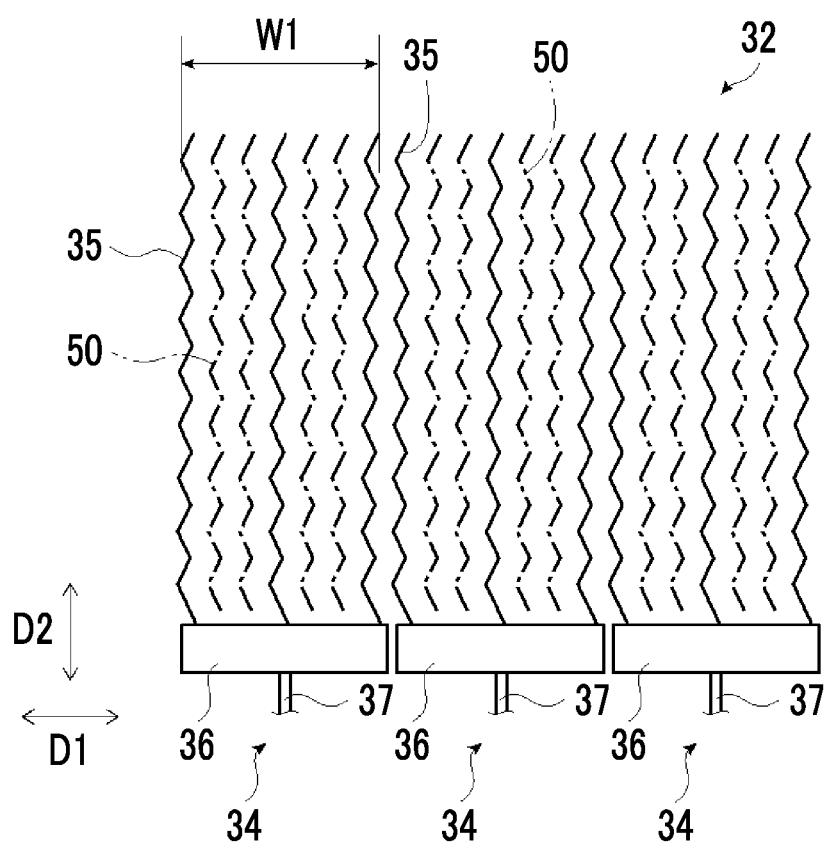
FIG. 5 is a view schematically illustrating a first example of a first electrode layer of a conductive sheet for a touch panel according to an embodiment of the invention.
Figure 6:
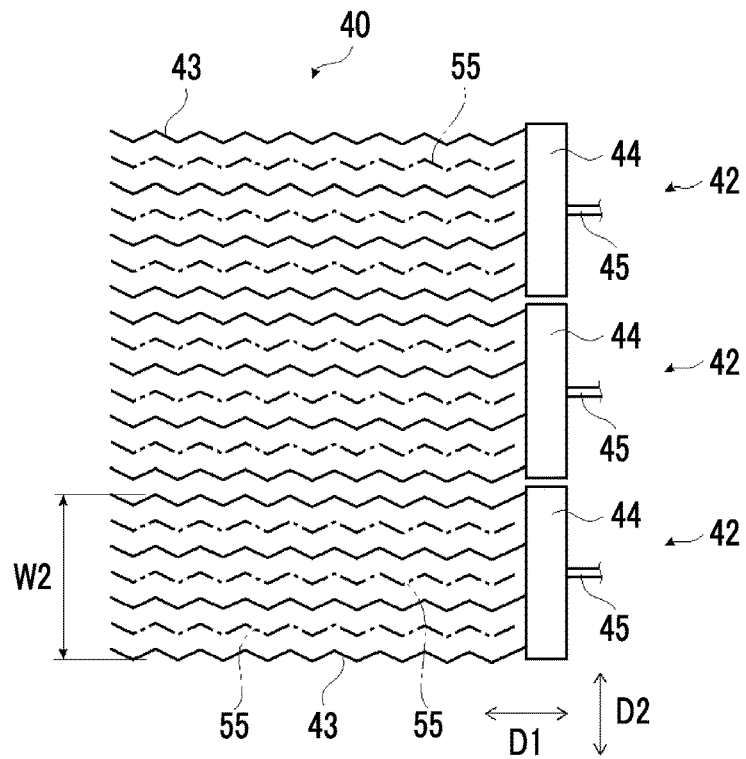
FIG. 6 is a view schematically illustrating a first example of a second electrode layer of the conductive sheet for a touch panel according to an embodiment of the invention.
Figure 7:
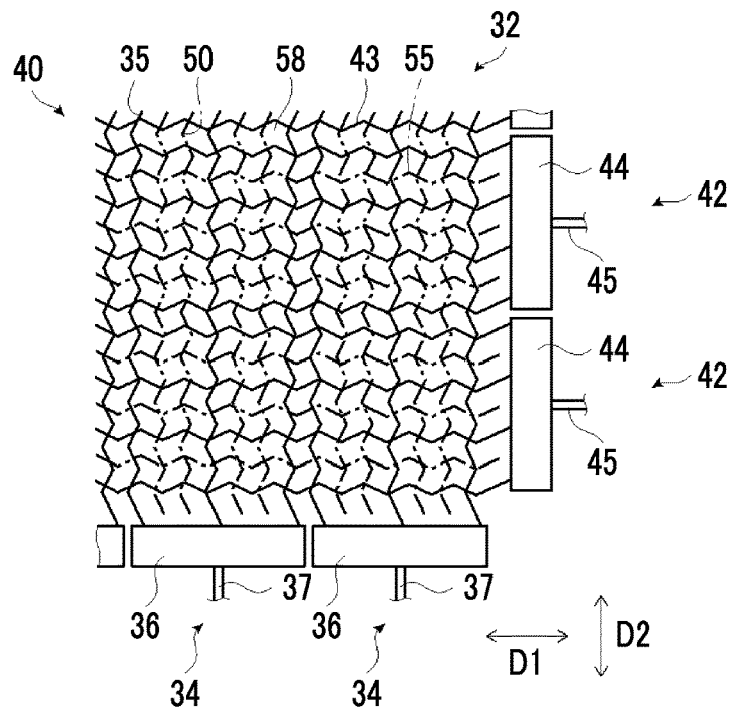
FIG. 7 is a view schematically illustrating a state in which the first example of the first electrode layer and the first example of the second electrode layer of the conductive sheet for a touch panel according to an embodiment of the invention are overlapped.

FIG. 5 is a view schematically illustrating a first example of the first electrode layer of the conductive sheet for a touch panel according to an embodiment of the invention, and FIG. 6 is a view schematically illustrating a first example of the second electrode layer of the conductive sheet for a touch panel according to an embodiment of the invention. FIG. 7 is a view schematically illustrating a state in which the first example of the first electrode layer and the first example of the second electrode layer of the conductive sheet for a touch panel according to an embodiment of the invention are overlapped.

As illustrated in FIG. 5, a first electrode 34 of the first electrode layer 32 has a plurality of first electrode wires 35 disposed at intervals in a first direction D1. The first electrode wire 35 is formed of a thin metallic wire having a wire width of 10 μm or less, and in the example of FIG. 5, the first electrode wire has a bent shape. The bent shape refers to a folded line shape in which a plurality of linear portions having a linear shape are connected via bent portions.

In addition, the first electrode 34 has a plurality of first non-connecting wires 50, each of which is formed of a thin metallic wire having a wire width of 10 μm or less, that are not electrically connected to the first electrode wires 35. The first non-connecting wire 50 is indicated by a line differing from the first electrode wire 35 for the sake of illustration, but has the same configuration as the first electrode wire 35, except that it is not electrically connected to the first pad 36. In the example of FIG. 5, the first non-connecting wire 50 also has a bent shape.

As illustrated in FIG. 6, a second electrode 42 of the second electrode layer 40 has a plurality of second electrode wires 43 disposed at intervals in a second direction D2. The second electrode wire 43 is formed of a thin metallic wire having a wire width of 10 μm or less, and in the example of FIG. 6, the second electrode wire has a bent shape.

The second electrode 42 has a plurality of second non-connecting wires 55, each of which is formed of a thin metallic wire having a wire width of 10 μm or less, that are not electrically connected to the second electrode wires 43. The second non-connecting wire 55 is indicated by a line differing from the second electrode wire 43 for the sake of illustration, but has the same configuration as the second electrode wire 43, except that it is not electrically connected to the second pad 44. In the example of FIG. 5, the second non-connecting wire 55 also has a bent shape.

As illustrated in FIG. 7, in a state in which the first electrode layer 32 and the second electrode layer 40 are overlapped, lattices 58 are formed to form a mesh shape. This is provided by providing the first non-connecting wires 50 other than the first electrode wires 35 in the first electrode layer 32 and providing the second non-connecting wires 55 other than the second electrode wires 43 in the second electrode layer 40. FIG. 7 illustrates a state viewed from the first electrode layer 32, that is, the touch face side.

Figure 8:
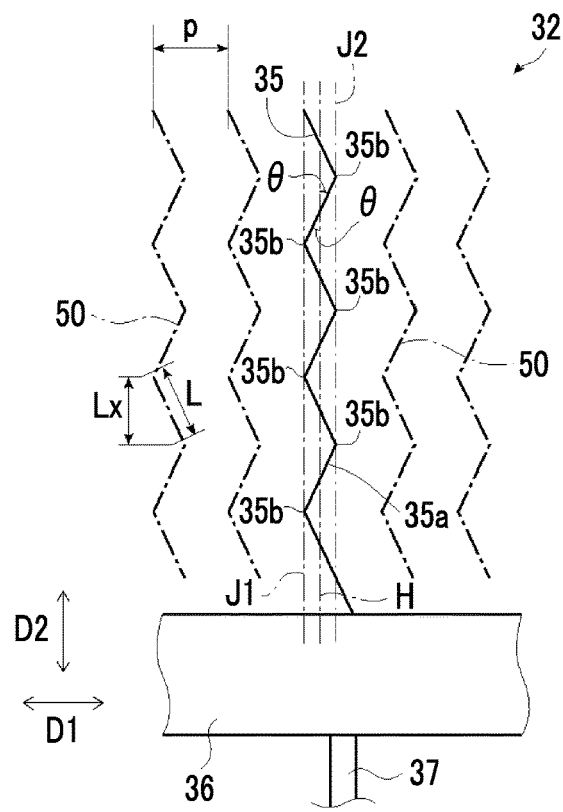
FIG. 8 is a view for schematically explaining a first electrode of the conductive sheet for a touch panel according to an embodiment of the invention.

FIG. 8 is a view for schematically explaining a first electrode of the conductive sheet for a touch panel according to an embodiment of the invention. The first electrode wire 35 having a bent shape will be described, but the second electrode wire 43 and the first electrode wire 35 have the same configuration. Therefore, description of the first electrode wire 35 will be given, but description of the second electrode wire 43 will be omitted.

As illustrated in FIG. 8, the first electrode wire 35 has a linear portion 35a and a bent portion 35b. The linear portion 35a is disposed so as to change the direction thereof for each bent portion 35b. The angle of an inner angle indicating the direction of the linear portion 35a is θ as an absolute value with respect to a straight line H parallel to the second direction D2. Therefore, the first electrode wire 35 is bent between a straight line J1 parallel to the second direction D2 and a straight line J2 parallel to the second direction D2. In the example illustrated in FIG. 8, the bent portion 35b is in contact with any one of the straight lines J1 and J2.

For example, a length L of the linear portion 35a may be set such that a length Lx of a component in the first direction D1 in the linear portion 35a is equal to a pitch p between the first electrode wires 35 in the first direction D1. The pitch p and the angle θ are properly set in accordance with the position detection accuracy required for the touch panel, the pixel shape in the display panel 20, or the like. The pitch p is preferably in a range of 200 μm to 1,000 μm. The angle θ is preferably 30° to 120°.

Here, in a case where a total area of the first non-connecting wires 50 in the first electrode 34 is indicated by A1, a total area of the first electrode wires 35 in the first electrode 34 is indicated by B1, and an occupation ratio of the first non-connecting wires 50 in the first electrode 34 is indicated by C1, C1=A1/(A1+B1) is satisfied. In addition, in a case where a total area of the second non-connecting wires 55 in the second electrode 42 is indicated by A2, a total area of the second electrode wires 43 in the second electrode 42 is indicated by B2, and an occupation ratio of the second non-connecting wires 55 in the second electrode 42 is indicated by C2, C2=A2/(A2+B2) is satisfied.

Regarding at least one of the plurality of first electrodes 34 and at least one of the plurality of second electrodes 42, C2<C1 is satisfied.

In the configuration of the first electrode 34 of FIG. 5, the occupation ratio C1 of the first non-connecting wires 50 can be changed by changing the ratio of the first non-connecting wires 50. In the configuration of the second electrode 42 of FIG. 6, the occupation ratio C2 of the second non-connecting wires 55 can be changed by changing the ratio of the second non-connecting wires 55.

An electrode width W1 of the first electrode 34 is a distance between the outer sides of the outermost electrode wires in the first direction D1 among the plurality of first electrode wires 35 connected to one first pad 36 in one first electrode 34 as illustrated in FIG. 5. In addition, the first non-connecting wires 50 are disposed between the outermost first electrode wires of the first electrode 34, and a wire (dummy wire) that is not electrically connected to the first electrode 34 disposed on the outer side of the outermost first electrode wire is not included in the first non-connecting wires 50.

An electrode width W2 of the second electrode 42 is a distance between the outer sides of the outermost electrode wires in the second direction D2 among the plurality of second electrode wires 43 connected to one second pad 44 in one second electrode 42 as illustrated in FIG. 6. In addition, the second non-connecting wires 55 are disposed between the outermost second electrode wires of the second electrode 42, and a wire (dummy wire) that is not electrically connected to the second electrode 42 disposed on the outer side of the outermost second electrode wire is not included in the second non-connecting wires 55.

The above-described pitch p between the first electrode wires 35 is not limited to an interval between the first electrode wires 35, and may also be applied between the first electrode wire 35 and the first non-connecting wire 50 and between the first non-connecting wires 50. By equalizing the above-described pitch p, the first electrode wires 35 or the like are uniformly disposed in the first electrode 34, and thus the detection sensitivity can be uniformized, and effects such as suppression of wire exposure are obtained.

The pitch p between the first electrode wires 35 is similarly applied to the case of the second electrode wires 43. The pitch is not limited to an interval between the second electrode wires 43, and may also be applied between the second electrode wire 43 and the second non-connecting wire 55 and between the second non-connecting wires 55. By equalizing the above-described pitch p, the second electrode wires 43 or the like are uniformly disposed in the second electrode 42, and thus the detection sensitivity can be uniformized, and effects such as suppression of wire exposure are obtained.

The electrode width W1 of the first electrode 34 and the electrode width W2 of the second electrode 42 are, for example, 1 to 4 mm. The pitch p between the first electrode wires 35 and the pitch p between the second electrode wires 43 are, for example, 100 to 3,000 μm, and preferably 200 to 1,000 μm.

The length of one side of a lattice of the mesh-like pattern formed in a state in which the first electrode layer 32 and the second electrode layer 40 are overlapped is 50 to 500 μm, and preferably 200 to 400 μm from the viewpoint of a difficulty in visual recognition of the mesh-like pattern. For this reason, the pitch p between the first electrode wires 35 and the pitch p between the second electrode wires 43 are preferably 200 to 400 μm in a case where a mesh-like pattern having lattices 58 is formed as illustrated in FIG. 7.

Here, as illustrated in FIG. 1, the first electrode layer 32 and the second electrode layer 40 are provided at different distances from the front surface 12a of the cover layer 12. Accordingly, it has been found that the first electrode layer 32 and the second electrode layer 40 are different in the detection sensitivity, and thus erroneous detection may be generated with a member such as a stylus pen with a tip end that is finer than a finger. Regarding this, the detection sensitivity in the first electrode layer 32 becomes approximately equal to the detection sensitivity in the second electrode layer 40 by satisfying C2<C1 as described above, where C1 is the occupation ratio of the first non-connecting wires 50 and C2 is the occupation ratio of the second non-connecting wires 55. Therefore, the detection sensitivity with respect to a stylus pen with a tip end that is finer than a finger is improved, and erroneous detection can be suppressed even with a stylus pen with a tip end diameter of 2 mm that is finer than a finger.

Satisfying C2<C1 is for suppressing erroneous detection in a case where a member such as a stylus pen that is finer than a finger is used. Accordingly, the above-described C2<C1 may be satisfied in at least the sensing region 48 (see FIG. 2). Hereinafter, the reason for satisfying C2<C1 will be further described, where C1 is the occupation ratio of the first non-connecting wires 50 and C2 is the occupation ratio of the second non-connecting wires 55.

Figure 36:
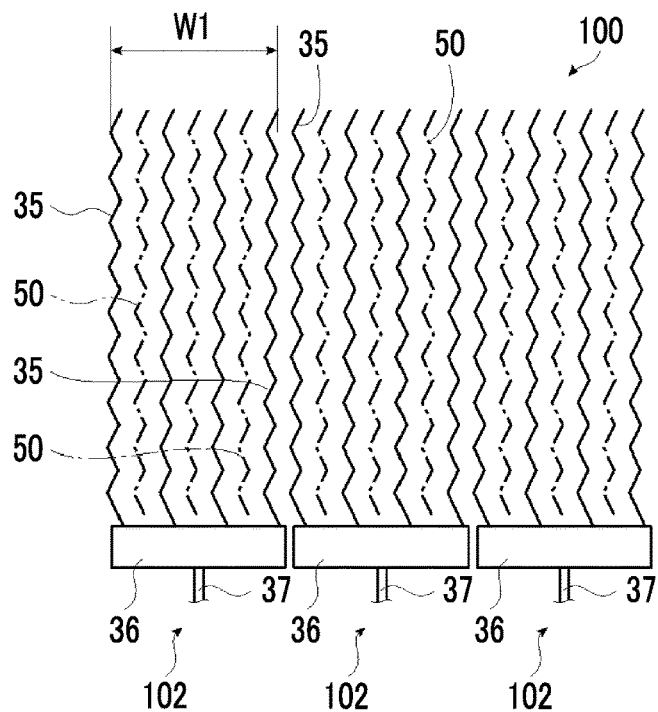
FIG. 36 is a view schematically illustrating a first electrode layer of a conventional conductive sheet for a touch panel.
Figure 37:
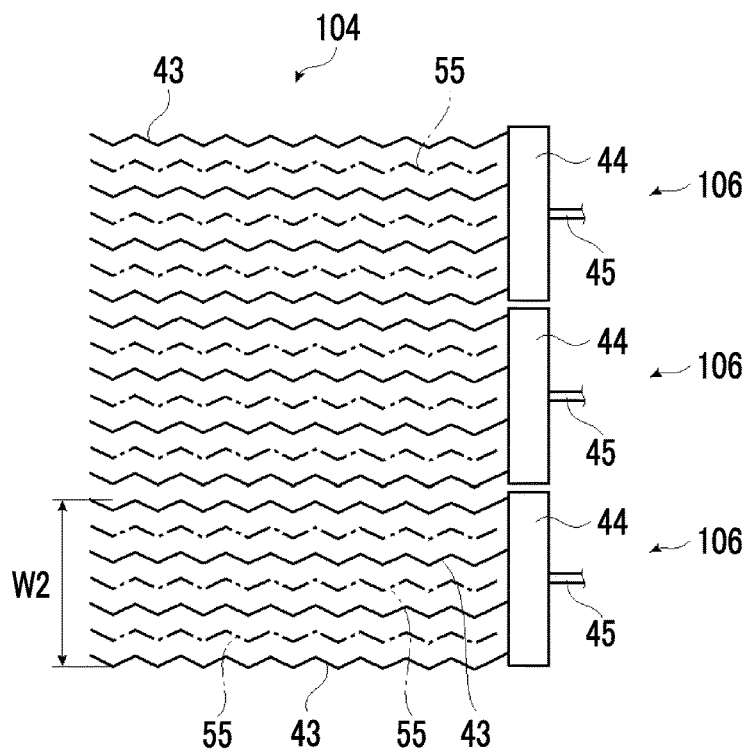
FIG. 37 is a view schematically illustrating a second electrode layer of the conventional conductive sheet for a touch panel.
Figure 38:
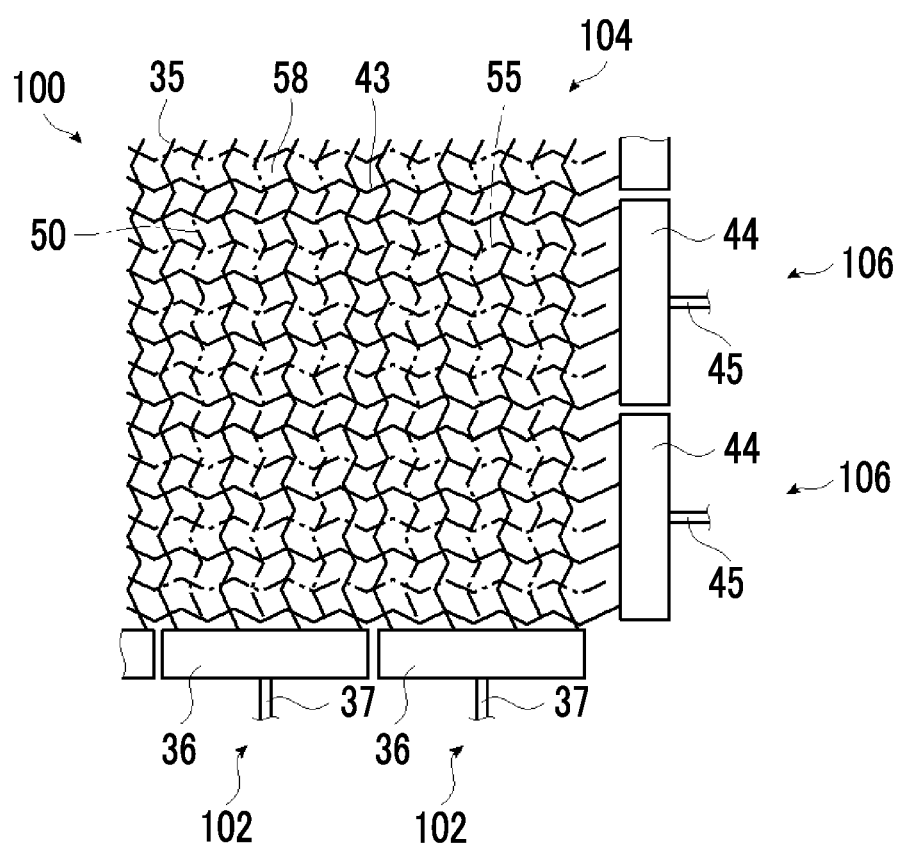
FIG. 38 is a view schematically illustrating a state in which the first electrode layer and the second electrode layer of the conventional conductive sheet for a touch panel are overlapped.

Here, FIG. 36 is a view schematically illustrating a first electrode layer of a conventional conductive sheet for a touch panel. FIG. 37 is a view schematically illustrating a second electrode layer of the conventional conductive sheet for a touch panel. FIG. 38 is a view schematically illustrating a state in which the first electrode layer and the second electrode layer of the conventional conductive sheet for a touch panel are overlapped.

In FIGS. 36 to 38, the same constituent parts as those in the configurations illustrated in FIGS. 5 to 7 will be denoted by the same references, and detailed description thereof will be omitted.

In a conventional first electrode layer 100 illustrated in FIG. 36, a plurality of first electrode wires 35 and a plurality of first non-connecting wires 50 are connected to a first pad 36 in a first electrode 102. In addition, in a conventional second electrode layer 104 illustrated in FIG. 37, a plurality of second electrode wires 43 and a plurality of second non-connecting wires 55 are connected to a second pad 44 in a second electrode 106.

The first electrode 102 of the first electrode layer 100 illustrated in FIG. 36 and the second electrode 106 of the second electrode layer 104 illustrated in FIG. 37 have the same configuration. As illustrated in FIG. 38, a mesh form is made in a state in which the first electrode layer 100 and the second electrode layer 104 are overlapped.

As described above, the first electrode 102 of the first electrode layer 100 and the second electrode 106 of the second electrode layer 104 have the same configuration. Accordingly, the first electrode layer 100 and the second electrode layer 104 are different in the sensitivity in a case where these are provided at different distances from a front surface 12a of a cover layer 12, and this causes erroneous detection.

Regarding the difference in the detection sensitivity, the detection sensitivity of the electrode related to a stylus pen with a fine tip end has been found to be adjustable by an occupation area ratio of the non-connecting wires in the electrode. Specifically, it has been found that the lower the occupation area ratio of the non-connecting wires in the electrode, the higher the detection sensitivity of the electrode. By making the occupation area ratio of the non-connecting wires in the first electrode 34 close to the touch face larger than the occupation area ratio of the non-connecting wires in the second electrode 42 remote from the touch face, the detection sensitivity of the first electrode 34 and the detection sensitivity of the second electrode 42 with respect to a stylus pen with a fine tip end are made same.

Regarding the occupation ratio C1 of the first non-connecting wires 50 and the occupation ratio C2 of the second non-connecting wires 55, C2<C1 is satisfied, but in order to keep a balance between the erroneous detection and the sensitivity, $1.0 < C1/C2 \leq 3.0$ is preferably satisfied, and $1.2 \leq C1/C2 \leq 2.0$ is more preferably satisfied.

In a case where an area of the first electrode 34 is indicated by E1 and an area of the second electrode 42 is indicated by E2, the total area A1 of the first non-connecting wires 50, the total area B1 of the first electrode wires 35, the area E1 of the first electrode 34, the total area A2 of the second non-connecting wires 55, the total area B2 of the second electrode wires 43, and the area E2 of the second electrode 42 preferably satisfy $0.9 < ((A1+B1)/E1)/((A2+B2)/E2) < 1.1$. The relation between the area E1 of the first electrode 34 and the area E2 of the second electrode 42 is under the premise that the above-described C2<C1 is satisfied.

The area E1 of the first electrode 34 is represented by the product of the electrode width W1 of the first electrode 34 and an electrode length Lm (see FIG. 2) of the first electrode 34 in the second direction D2. That is, the area E1 of the first electrode 34 is represented by E1=W1×Lm.

The area E2 of the second electrode 42 is represented by the product of the electrode width W2 of the second electrode 42 and an electrode length Ln (see FIG. 2) of the second electrode 42 in the first direction D1. That is, the area E2 of the second electrode 42 is represented by E2=W2×Ln.

(A1+B1)/E1 represents the density of the thin metallic wires in the first electrode 34. (A2+B2)/E2 represents the density of the thin metallic wires in the second electrode 42.

In a case where $0.9 < ((A1+B1)/E1)/((A2+B2)/E2) < 1.1$ is satisfied, the density of the thin metallic wires in the first electrode 34 becomes the same as the density of the thin metallic wires in the second electrode 42, and thus exposure of the electrode wire or the like is suppressed, and visibility is improved.

The electrode width of the first electrode 34 and the electrode width of the second electrode 42 are preferably the same since the in-plane uniformity of the sensitivity of a touch panel is improved. In addition, in the first electrode layer 32, each of the first electrode wire 35 and the first non-connecting wire 50 is preferably a thin metallic wire having a wire width of 10 µm or less, and in the second electrode layer 40, each of the second electrode wire 43 and the second non-connecting wire 55 is preferably a thin metallic wire having a wire width of 10 µm or less.

Preferably, the first electrode wire 35, the first non-connecting wire 50, the second electrode wire 43, and the second non-connecting wire 55 have the same wire width, and are thin metallic wires having a wire width of 5.0 µm or less, and particularly preferably 1.0 µm to 5.0 µm. Here, the same wire width means that the wire width is within a range of ±10%. Accordingly, in a case where the wire width is 5.0 µm, wires having a wire width of 4.5 µm to 5.5 µm are regarded to have the same wire width.

The wire widths of the wires in the first electrode layer 32 and the second electrode layer 40 described above are all average values.

Regarding the wire widths of the wires in the first electrode layer 32 and the second electrode layer 40 described above, first, an image of an object wire is acquired in a direction vertical to the front surface 30a of the transparent insulating base 30, and taken into a personal computer to extract the wire. A wire width is obtained along the extracted wire, and a plurality of wire widths are obtained to obtain an average wire width of a plurality of wires. This average value is set as a wire width.

The thickness of the wires in the first electrode layer 32 and the second electrode layer 40 described above is not particularly limited, but preferably 0.05 to 10 μm, and most preferably 0.1 to 1 μm. In a case where the thickness is within the above-described range, a wire having a low resistance and excellent durability can be relatively easily formed.

In a case where the thickness of the wires in the first electrode layer 32 and the second electrode layer 40 described above is measured, a cross-sectional image of a wire that is a measurement object is acquired, taken into a personal computer, and displayed on a monitor. At two places specifying the thickness of the wire that is a measurement object, horizontal lines are respectively drawn, and a length between the horizontal lines is obtained. Accordingly, the thickness of the wire that is a measurement object can be obtained.

The above-described first electrode 34 illustrated in FIG. 5 has the first electrode wires 35 having a bent shape, and the second electrode 42 illustrated in FIG. 6 has the second electrode wires 43 having a bent shape. However, the electrodes are not limited thereto, and as will be shown below, the electrodes may be mesh electrodes in which electrode wires are disposed in a mesh.

Figure 9:
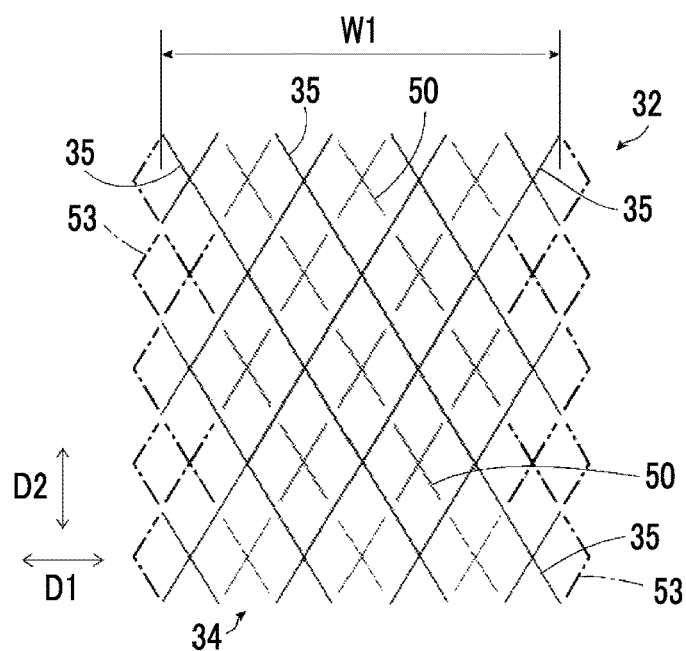
FIG. 9 is a view schematically illustrating a second example of the first electrode layer of the conductive sheet for a touch panel according to an embodiment of the invention.
Figure 10:
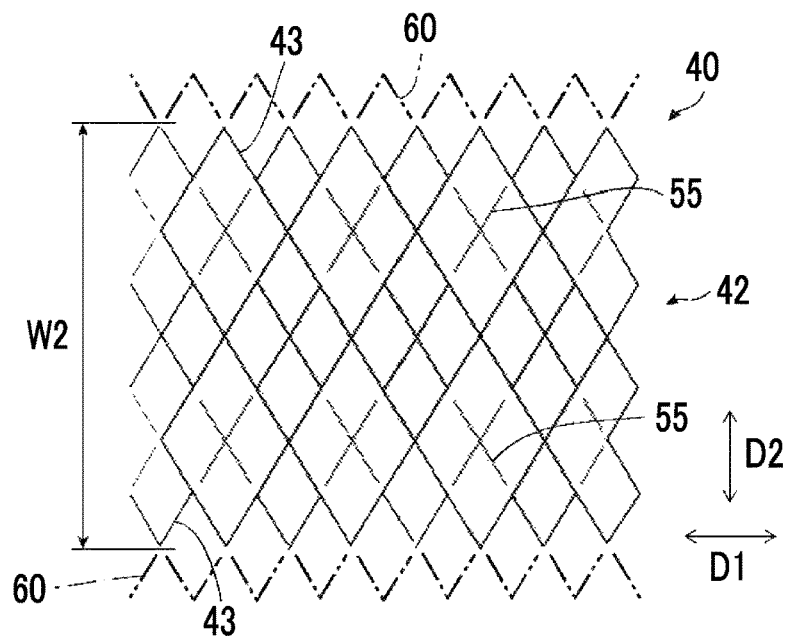
FIG. 10 is a view schematically illustrating a second example of the second electrode layer of the conductive sheet for a touch panel according to an embodiment of the invention.
Figure 11:
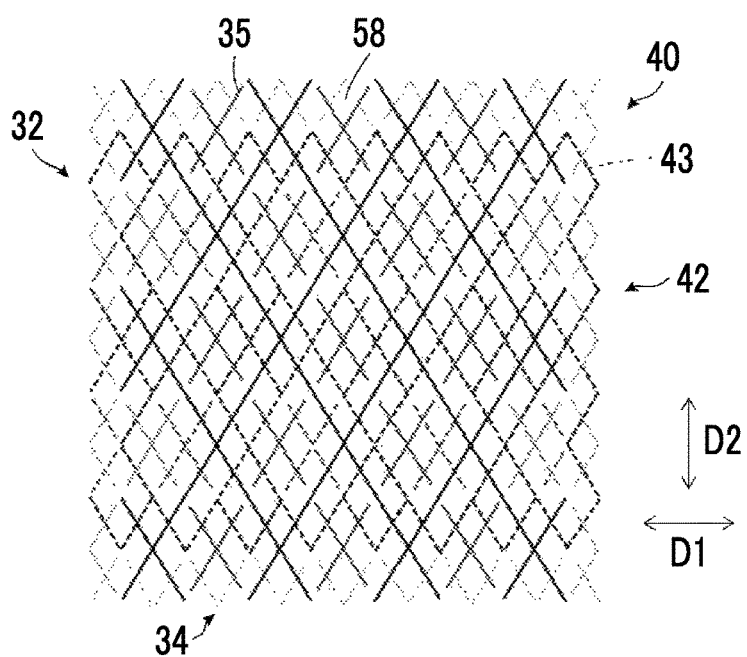
FIG. 11 is a view schematically illustrating a state in which the second example of the first electrode layer and the second example of the second electrode layer of the conductive sheet for a touch panel according to an embodiment of the invention are overlapped.

Here, FIG. 9 is a view schematically illustrating a second example of the first electrode layer of the conductive sheet for a touch panel according to an embodiment of the invention. FIG. 10 is a view schematically illustrating a second example of the second electrode layer of the conductive sheet for a touch panel according to an embodiment of the invention. FIG. 11 is a view schematically illustrating a state in which the second example of the first electrode layer and the second example of the second electrode layer of the conductive sheet for a touch panel according to an embodiment of the invention are overlapped.

In FIGS. 9 to 11, the same constituent parts as those in the configurations illustrated in FIGS. 5 to 7 will be denoted by the same references, and detailed description thereof will be omitted. FIGS. 9 to 11 illustrate only an intersection portion 59 (see FIG. 2) in which the first electrode 34 and the second electrode 42 are overlapped.

The first electrode 34 illustrated in FIG. 9 and the second electrode 42 illustrated in FIG. 10 have a mesh-like electrode configuration. In a case where the mesh-like first electrode 34 illustrated in FIG. 9 and the mesh-like second electrode 42 illustrated in FIG. 10 are overlapped, lattices 58 having the same rhombus shape are formed to form a mesh shape as illustrated in FIG. 11.

The first electrode 34 illustrated in FIG. 9 has first electrode wires 35, first non-connecting wires 50, and first dummy wires 53. The first electrode wires 35, the first non-connecting wires 50, and the first dummy wires 53 form, for example, a mesh electrode with a rhombus lattice shape. The first non-connecting wires 50 are disposed to partition the rhombus lattices by congruent rhombi in the rhombus lattices formed by the first electrode wires 35. The first dummy wires 53 are provided to be insulated from the first electrode wires 35 between the adjacent first electrodes 34. The first dummy wires 53 also form rhombus lattices.

An electrode width W1 of the first electrode 34 is the maximum length in the first direction D1 from end to end of the first electrode wires 35 to be disposed. The first non-connecting wires 50 are disposed in inner regions surrounded by the plurality of first electrode wires 35 connected to the same first pad 36, and the first dummy wires 53 are disposed between the adjacent first electrodes. The first dummy wires 53 are not included in the electrode width W1 of the first electrode 34.

The second electrode 42 illustrated in FIG. 10 has second electrode wires 43, second non-connecting wires 55, and second dummy wires 60. The second electrode wires 43, the second non-connecting wires 55, and the second dummy wires 60 form, for example, a mesh electrode with a rhombus lattice shape. The second non-connecting wires 55 are disposed to partition the rhombus lattices by congruent rhombi in the rhombus lattices formed by the second electrode wires 43. The second dummy wires 60 are provided between the second electrodes 42. The second dummy wires 60 also form rhombus lattices.

An electrode width W2 of the second electrode 42 is the maximum length in the second direction D2 from end to end of the second electrode wires 43 to be disposed. The second non-connecting wires 55 are disposed in inner regions surrounded by the plurality of second electrode wires 43 connected to the same second pad 44, and the second dummy wires 60 are disposed between the adjacent second electrodes. The second dummy wires 60 are not included in the electrode width W2 of the second electrode 42.

An occupation ratio C1 of the first non-connecting wires 50 of the first electrode 34 illustrated in FIG. 9 and an occupation ratio C2 of the second non-connecting wires 55 of the second electrode 42 illustrated in FIG. 10 satisfy C2<C1.

The occupation ratio C1 of the first non-connecting wires 50 can be changed by a proportion of the first electrode wires 35 or the first non-connecting wires 50 provided in the first electrode 34. The occupation ratio C2 of the second non-connecting wires 55 can be changed by a proportion of the second electrode wires 43 or the second non-connecting wires 55 provided in the second electrode 42.

The mesh electrode is not limited to those illustrated in FIGS. 9 to 11.

Figure 12:
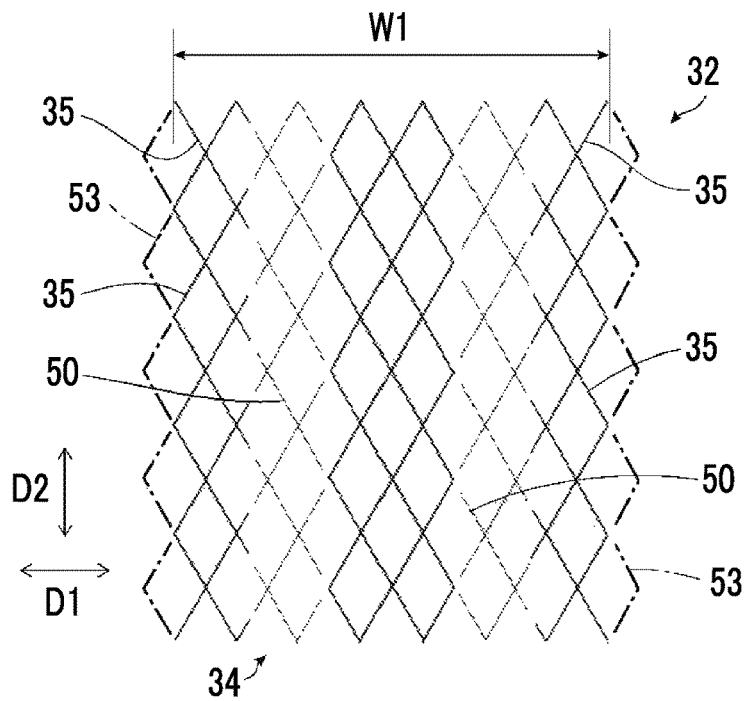
FIG. 12 is a view schematically illustrating a third example of the first electrode layer of the conductive sheet for a touch panel according to an embodiment of the invention.
Figure 13:
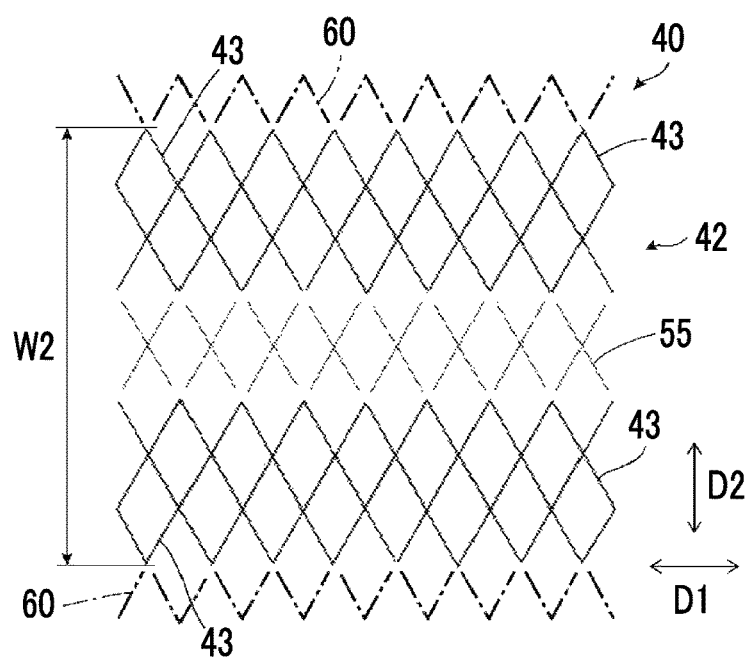
FIG. 13 is a view schematically illustrating a third example of the second electrode layer of the conductive sheet for a touch panel according to an embodiment of the invention.
Figure 14:
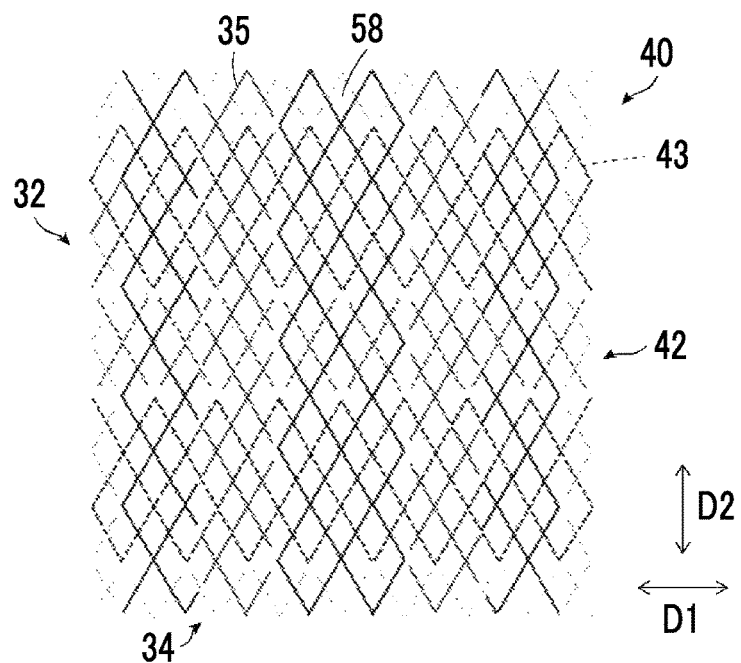
FIG. 14 is a view schematically illustrating a state in which the third example of the first electrode layer and the third example of the second electrode layer of the conductive sheet for a touch panel according to an embodiment of the invention are overlapped.

FIG. 12 is a view schematically illustrating a third example of the first electrode layer of the conductive sheet for a touch panel according to an embodiment of the invention. FIG. 13 is a view schematically illustrating a third example of the second electrode layer of the conductive sheet for a touch panel according to an embodiment of the invention. FIG. 14 is a view schematically illustrating a state in which the third example of the first electrode layer and the third example of the second electrode layer of the conductive sheet for a touch panel according to an embodiment of the invention are overlapped.

In FIGS. 12 to 14, the same constituent parts as those in the configurations illustrated in FIGS. 9 to 11 will be denoted by the same references, and detailed description thereof will be omitted. FIGS. 12 to 14 illustrate only an intersection portion 59 (see FIG. 2) in which the first electrode 34 and the second electrode 42 are overlapped.

The first electrode 34 illustrated in FIG. 12 and the second electrode 42 illustrated in FIG. 13 have a mesh-like electrode configuration. In a case where the mesh-like first electrode 34 illustrated in FIG. 12 and the mesh-like second electrode 42 illustrated in FIG. 13 are overlapped, lattices 58 having a rhombus shape are formed to form a mesh shape as illustrated in FIG. 14.

The first electrode 34 illustrated in FIG. 12 has the same configuration as the first electrode 34 illustrated in FIG. 9, except that a part of the rhombus lattices formed by the first electrode wires 35 is substituted by first non-connecting wires 50 in comparison to the case of the first electrode 34 illustrated in FIG. 9.

The first non-connecting wires 50 form rhombus lattices in the second direction D2, and these are provided at intervals in the first direction D1.

The second electrode 42 illustrated in FIG. 13 has the same configuration as the second electrode 42 illustrated in FIG. 10, except that a pattern with a rhombus lattice shape formed by the second electrode wires 43 and a pattern with a rhombus lattice shape formed by the second non-connecting wires 55 are alternately disposed in the second direction D2 in comparison to the case of the second electrode 42 illustrated in FIG. 10.

Figure 15:
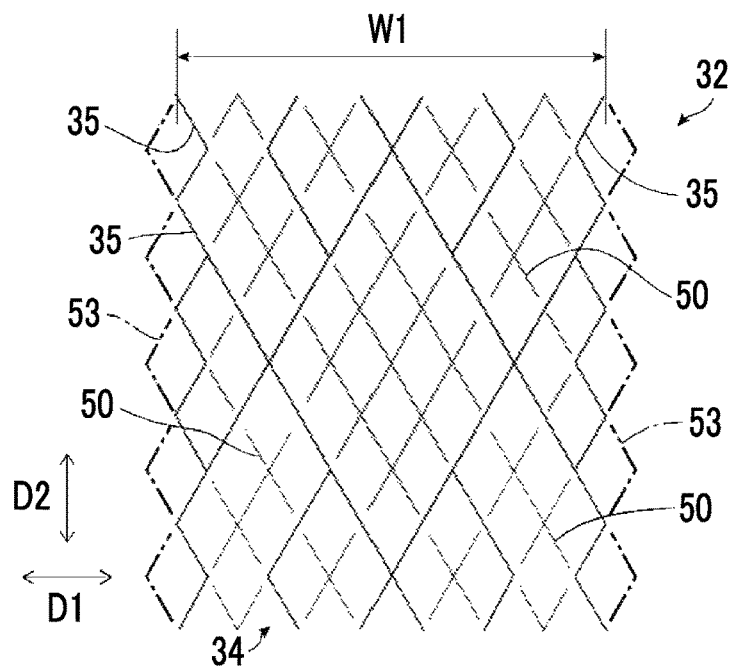
FIG. 15 is a view schematically illustrating a fourth example of the first electrode layer of the conductive sheet for a touch panel according to an embodiment of the invention.
Figure 16:
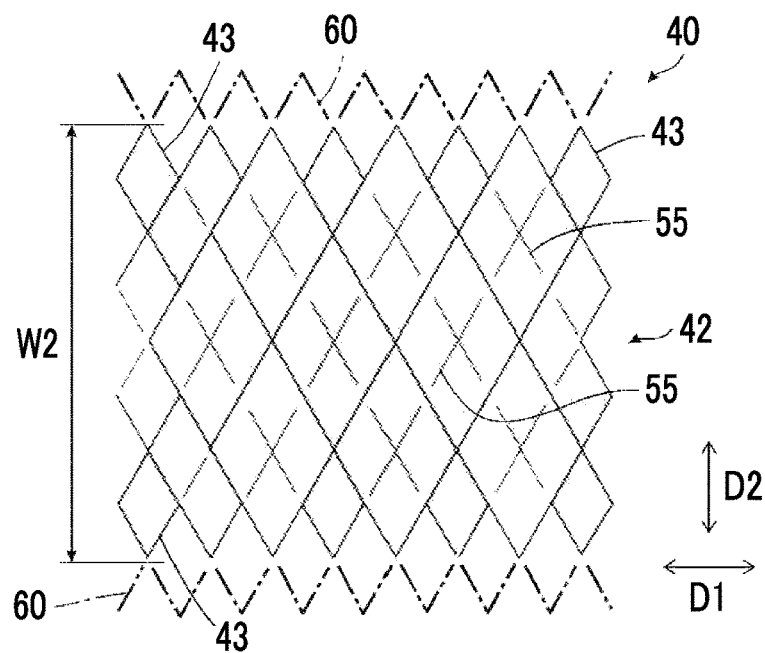
FIG. 16 is a view schematically illustrating a fourth example of the second electrode layer of the conductive sheet for a touch panel according to an embodiment of the invention.
Figure 17:
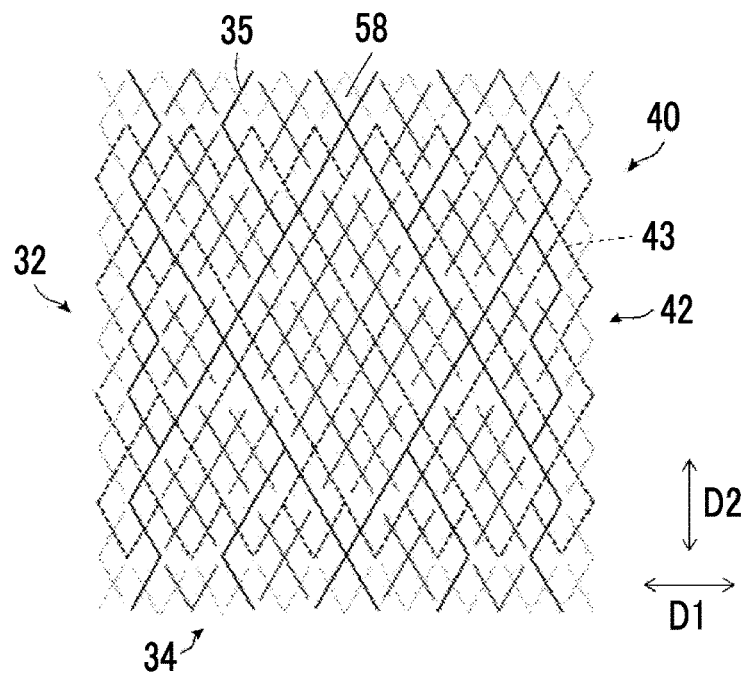
FIG. 17 is a view schematically illustrating a state in which the fourth example of the first electrode layer and the fourth example of the second electrode layer of the conductive sheet for a touch panel according to an embodiment of the invention are overlapped.

Configurations illustrated in FIGS. 15 to 17 may also be employed as the electrode configurations.

FIG. 15 is a view schematically illustrating a fourth example of the first electrode layer of the conductive sheet for a touch panel according to an embodiment of the invention. FIG. 16 is a view schematically illustrating a fourth example of the second electrode layer of the conductive sheet for a touch panel according to an embodiment of the invention. FIG. 17 is a view schematically illustrating a state in which the fourth example of the first electrode layer and the fourth example of the second electrode layer of the conductive sheet for a touch panel according to an embodiment of the invention are overlapped.

In FIGS. 15 to 17, the same constituent parts as those in the configurations illustrated in FIGS. 9 to 11 will be denoted by the same references, and detailed description thereof will be omitted. FIGS. 15 to 17 illustrate only an intersection portion 59 (see FIG. 2) in which the first electrode 34 and the second electrode 42 are overlapped.

In a case where the mesh-like first electrode 34 illustrated in FIG. 15 and the mesh-like second electrode 42 illustrated in FIG. 16 are overlapped, lattices 58 having a rhombus shape are formed to form a mesh shape as illustrated in FIG. 17.

The first electrode 34 illustrated in FIG. 15 has the same configuration as the first electrode 34 illustrated in FIG. 9, except that the number of first non-connecting wires 50 provided in the rhombus lattices formed by the first electrode wires 35 is larger than in the first electrode 34 illustrated in FIG. 9. The occupation ratio C1 of the first non-connecting wires 50 is higher in the first electrode 34 illustrated in FIG. 15 than in the first electrode 34 illustrated in FIG. 9.

The second electrode 42 illustrated in FIG. 16 has the same configuration as the second electrode 42 illustrated in FIG. 10, except that the number of second non-connecting wires 55 provided in the rhombus lattices formed by the second electrode wires 43 is larger than in the second electrode 42 illustrated in FIG. 10. The occupation ratio C2 of the second non-connecting wires 55 is higher in the second electrode 42 illustrated in FIG. 16 than in the second electrode 42 illustrated in FIG. 10.

In the mesh electrode, the mesh pattern is not particularly limited to a pattern provided by combining rhombi as described above. The mesh pattern is preferably a combination of triangles such as equilateral triangles, isosceles triangles, or right triangles, quadrangles such as squares, rectangles, parallelograms, or trapezoids, polygons such as hexagons or octagons, circles, ellipses, stars, or geometric shapes provided by combining the above shapes. Particularly, mesh patterns formed by the repetition of the same rhombus shape as illustrated in FIGS. 9 to 17 are preferable from the viewpoint of moire reduction of a touch panel, and the angle of an acute angle of the rhombus is more preferably 30 degrees to 60 degrees from the viewpoint of moire reduction. The mesh pattern is provided by combining a large number of cells formed into a lattice shape. The mesh pattern may be formed by combining lattices having a similar or congruent shape, or lattices having different shapes. In addition, the mesh pattern may be a random mesh pattern provided by combining irregular shapes, or a mesh pattern in which sides of rhombi having the same shape are irregularly changed within a range of ±10%. The length of one side of a lattice or a rhombus is not particularly limited, but preferably 50 to 500 μm, and more preferably 200 to 400 μm in view of a difficulty in visual recognition. In a case where the length of a side of a unit lattice is within the above-described range, good transparency can be maintained, and the display can be visually recognized without uncomfortable feeling in a case where the mesh pattern is disposed on a display panel.

The mesh pattern may be formed by combining curved lines. For example, arcs may be combined to form lattice-like cells having a circular or elliptical shape. As the arc, for example, an arc of 90° or an arc of 180° can be used.

In the mesh electrode, the wire width of a thin metallic wire that forms the first electrode wire 35 or the second electrode wire 43 is preferably 5.0 μm or less, and the wire width is, for example, 1.0 μm to 5.0 μm. In a case where the wire width is within the above-described range, a wire having a low resistance and suppressed from being exposed can be relatively easily formed.

Figure 18:
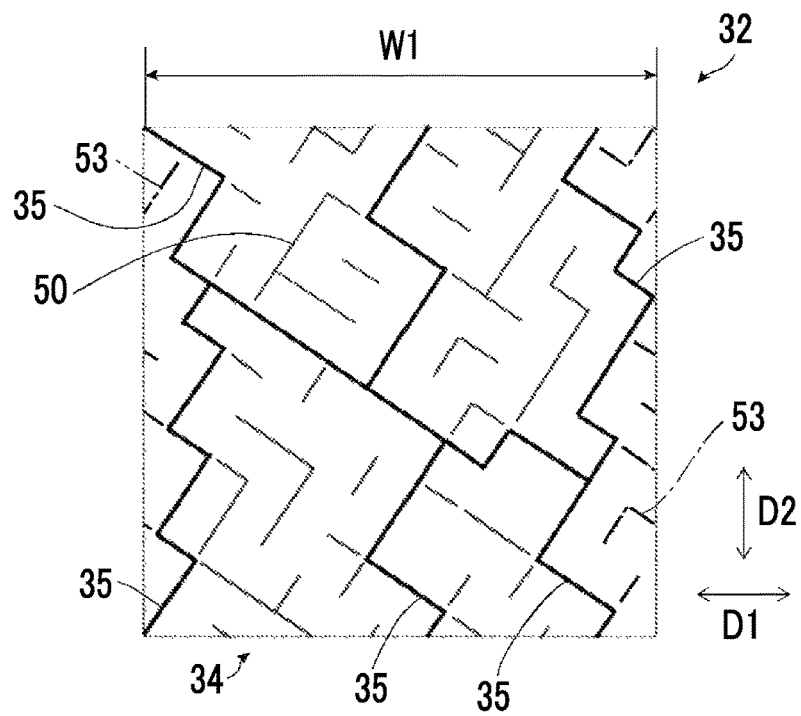
FIG. 18 is a view schematically illustrating a fifth example of the first electrode layer of the conductive sheet for a touch panel according to an embodiment of the invention.
Figure 19:
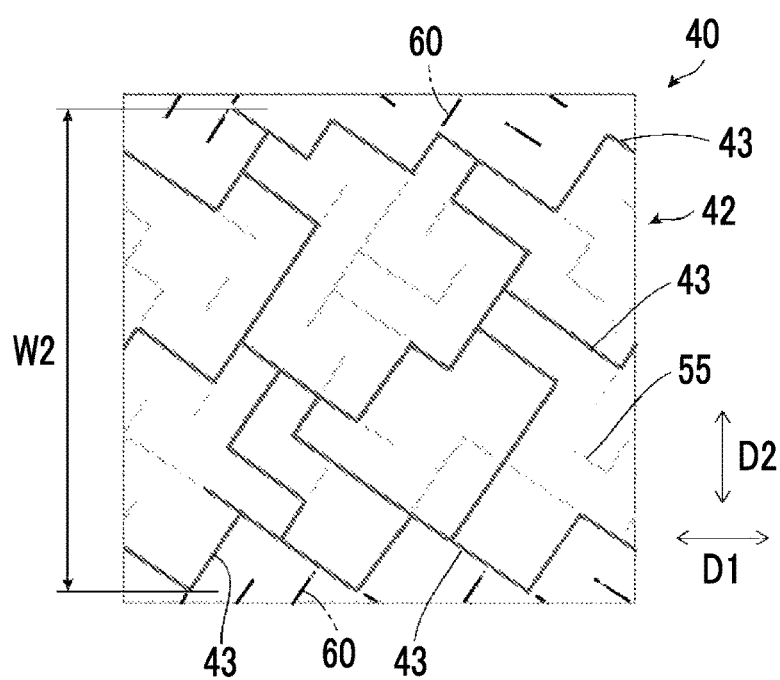
FIG. 19 is a view schematically illustrating a fifth example of the second electrode layer of the conductive sheet for a touch panel according to an embodiment of the invention.
Figure 20:
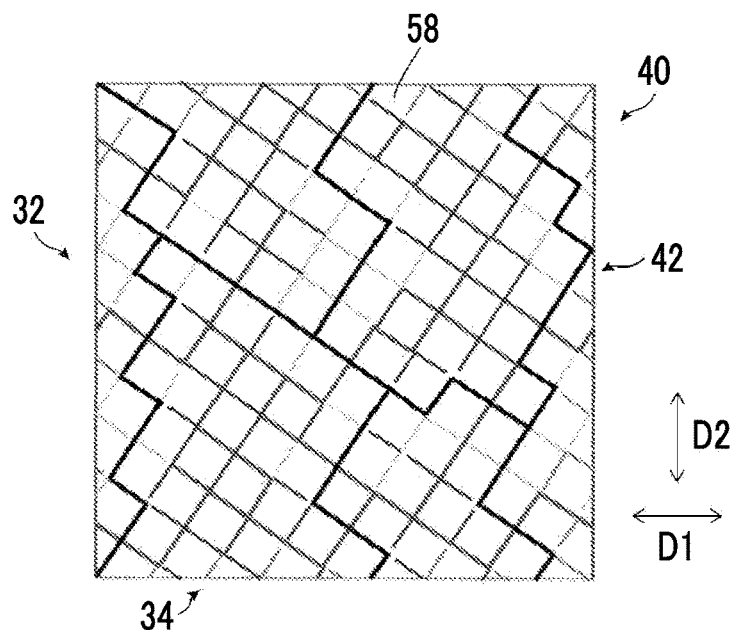
FIG. 20 is a view schematically illustrating a state in which the fifth example of the first electrode layer and the fifth example of the second electrode layer of the conductive sheet for a touch panel according to an embodiment of the invention are overlapped.

Other than the mesh electrodes, configurations illustrated in FIGS. 18 to 20 may also be employed as the electrode configurations.

FIG. 18 is a view schematically illustrating a fifth example of the first electrode layer of the conductive sheet for a touch panel according to an embodiment of the invention. FIG. 19 is a view schematically illustrating a fifth example of the second electrode layer of the conductive sheet for a touch panel according to an embodiment of the invention. FIG. 20 is a view schematically illustrating a state in which the fifth example of the first electrode layer and the fifth example of the second electrode layer of the conductive sheet for a touch panel according to an embodiment of the invention are overlapped.

In FIGS. 18 to 20, the same constituent parts as those in the configurations illustrated in FIGS. 5 to 7 will be denoted by the same references, and detailed description thereof will be omitted. FIGS. 18 to 20 illustrate only an intersection portion 59 (see FIG. 2) in which the first electrode 34 and the second electrode 42 are overlapped. In a case where the first electrode 34 illustrated in FIG. 18 and the second electrode 42 illustrated in FIG. 19 are overlapped, lattices 58 having a rhombus shape are formed to form a mesh shape as illustrated in FIG. 20. In FIGS. 18 to 20, the line thickness is changed for the sake of illustration, but the line thickness has no relation with the actual thickness.

The first electrode 34 illustrated in FIG. 18 has first electrode wires 35, first non-connecting wires 50, and first dummy wires 53. For example, the first electrode wires 35 are bent, and the first non-connecting wires 50 are provided in a region surrounded by the first electrode wires 35. The first dummy wires 53 insulated from the first electrode wires 35 are provided between the adjacent first electrodes 34.

The second electrode 42 illustrated in FIG. 19 has second electrode wires 43, second non-connecting wires 55, and second dummy wires 60. For example, the second electrode wires 43 are bent, and the second non-connecting wires 55 are provided in a region surrounded by the second electrode wires 43. The second dummy wires 60 insulated from the second electrode wires 43 are provided between the adjacent second electrodes 42.

An occupation ratio C1 of the first non-connecting wires 50 and an occupation ratio C2 of the second non-connecting wires satisfy C2<C1. In this case, C2<C1 can be satisfied by increasing the number of the first non-connecting wires 50 or reducing the number of the second non-connecting wires 55.

The shapes of the first electrode wires 35, the first non-connecting wires 50, and the first dummy wires 53 of the first electrode 34 illustrated in FIG. 18 and the shapes of the second electrode wires 43, the second non-connecting wires 55, and the second dummy wires 60 of the second electrode 42 illustrated in FIG. 19 are properly determined under conditions that when the first electrode 34 and the second electrode 42 are overlapped, for example, the lattices 58 having a rhombus shape are formed to form a mesh shape as illustrated in FIG. 20 and C2<C1 is satisfied as described above.

Figure 21:
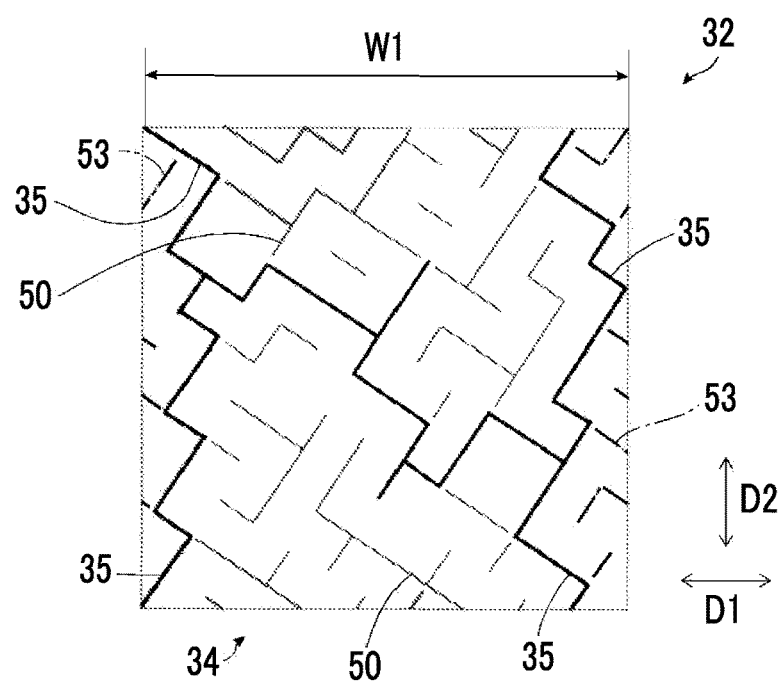
FIG. 21 is a view schematically illustrating a sixth example of the first electrode layer of the conductive sheet for a touch panel according to an embodiment of the invention.
Figure 22:
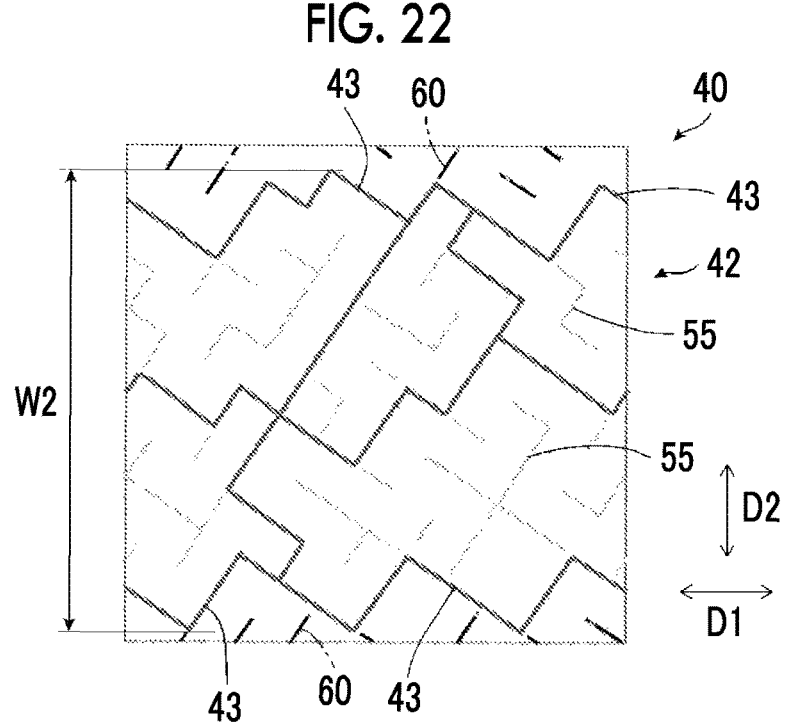
FIG. 22 is a view schematically illustrating a sixth example of the second electrode layer of the conductive sheet for a touch panel according to an embodiment of the invention.
Figure 23:
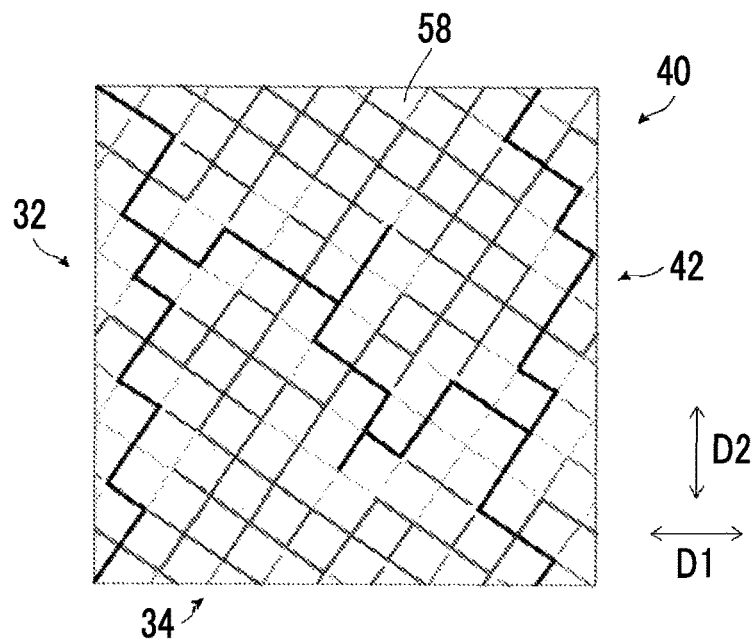
FIG. 23 is a view schematically illustrating a state in which the sixth example of the first electrode layer and the sixth example of the second electrode layer of the conductive sheet for a touch panel according to an embodiment of the invention are overlapped.
Figure 24:
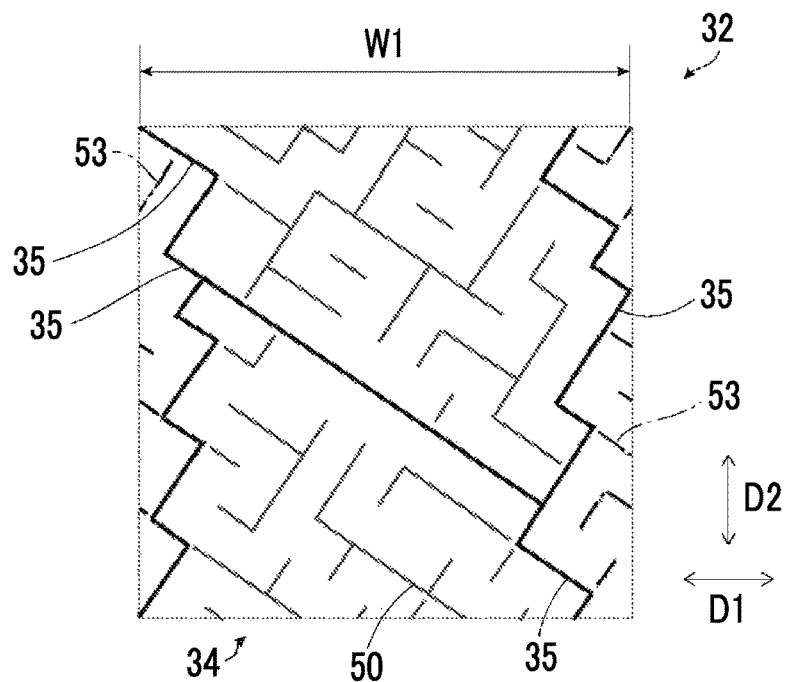
FIG. 24 is a view schematically illustrating a seventh example of the first electrode layer of the conductive sheet for a touch panel according to an embodiment of the invention.
Figure 25:
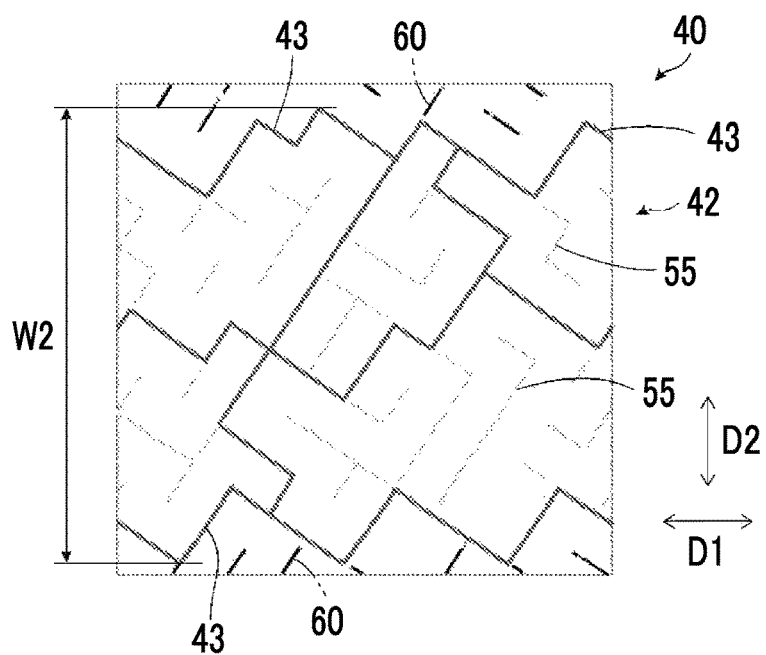
FIG. 25 is a view schematically illustrating a seventh example of the second electrode layer of the conductive sheet for a touch panel according to an embodiment of the invention.
Figure 26:
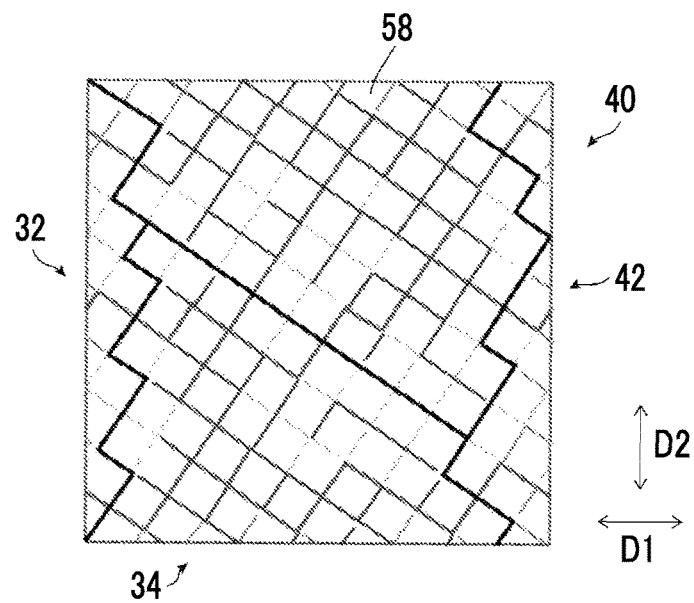
FIG. 26 is a view schematically illustrating a state in which the seventh example of the first electrode layer and the seventh example of the second electrode layer of the conductive sheet for a touch panel according to an embodiment of the invention are overlapped.

Configurations illustrated in FIGS. 21 to 23 or configurations illustrated in FIGS. 24 to 26 may also be employed as the electrode configurations.

FIG. 21 is a view schematically illustrating a sixth example of the first electrode layer of the conductive sheet for a touch panel according to an embodiment of the invention. FIG. 22 is a view schematically illustrating a sixth example of the second electrode layer of the conductive sheet for a touch panel according to an embodiment of the invention. FIG. 23 is a view schematically illustrating a state in which the sixth example of the first electrode layer and the sixth example of the second electrode layer of the conductive sheet for a touch panel according to an embodiment of the invention are overlapped.

FIG. 24 is a view schematically illustrating a seventh example of the first electrode layer of the conductive sheet for a touch panel according to an embodiment of the invention. FIG. 25 is a view schematically illustrating a seventh example of the second electrode layer of the conductive sheet for a touch panel according to an embodiment of the invention. FIG. 26 is a view schematically illustrating a state in which the seventh example of the first electrode layer and the seventh example of the second electrode layer of the conductive sheet for a touch panel according to an embodiment of the invention are overlapped.

In FIGS. 21 to 26, the same constituent parts as those in the configurations illustrated in FIGS. 18 to 20 will be denoted by the same references, and detailed description thereof will be omitted. FIGS. 21 to 26 illustrate only an intersection portion 59 (see FIG. 2) in which the first electrode 34 and the second electrode 42 are overlapped.

In a case where the first electrode 34 illustrated in FIG. 21 and the second electrode 42 illustrated in FIG. 22 are overlapped, lattices 58 having a rhombus shape are formed to form a mesh shape as illustrated in FIG. 23. In addition, in a case where the first electrode 34 illustrated in FIG. 24 and the second electrode 42 illustrated in FIG. 25 are overlapped, lattices 58 having a rhombus shape are formed to form a mesh shape as illustrated in FIG. 26.

In FIGS. 21 to 23, the line thickness is changed for the sake of illustration, but the line thickness has no relation with the actual thickness. In addition, in FIGS. 24 to 26, the line thickness is changed for the sake of illustration, but the line thickness has no relation with the actual thickness.

Basically, the first electrode 34 illustrated in FIG. 21 and the first electrode 34 illustrated in FIG. 24 have the same configuration as the first electrode 34 illustrated in FIG. 18, and the number of the first non-connecting wires 50 and the arrangement pattern thereof are different.

Basically, the second electrode 42 illustrated in FIG. 22 and the second electrode 42 illustrated in FIG. 25 have the same configuration as the second electrode 42 illustrated in FIG. 19, and the number of the second non-connecting wires 55 and the arrangement pattern thereof are different.

In an electrode having an electrode configuration other than the configuration of the above-described mesh electrode, the wire widths of the first electrode wire 35, the first non-connecting wire 50, the first dummy wire 53, the second electrode wire 43, the second non-connecting wire 55, and the second dummy wire 60 are preferably 10 µm or less. In addition, it is more preferable that the first electrode wire 35, the first non-connecting wire 50, the first dummy wire 53, the second electrode wire 43, the second non-connecting wire 55, and the second dummy wire 60 have the same wire width and the wire width be 5 µm or less. Here, the same wire width means that the wire width is within a range of ±10% as described above. The wire widths of the first electrode wire 35, the first non-connecting wire 50, the first dummy wire 53, the second electrode wire 43, the second non-connecting wire 55, and the second dummy wire 60 are all average values, and the method of measuring a wire width is as described above.

The thicknesses of the first electrode wire 35, the first non-connecting wire 50, the first dummy wire 53, the second electrode wire 43, the second non-connecting wire 55, and the second dummy wire 60 are also not particularly limited, but preferably 0.005 to 10 µm, and most preferably 0.1 to 1 µm. In a case where the thickness is within the above-described range, a wire having a low resistance and excellent durability can be relatively easily formed. The method of measuring a wire thickness is as described above.

Hereinafter, the members of a touch panel will be described.

First, a first electrode wire, a first non-connecting wire, a first dummy wire, a second electrode wire, a second non-connecting wire, and a second dummy wire will be described.

<First Electrode Wire, First Non-Connecting Wire, First Dummy Wire, Second Electrode Wire, Second Non-Connecting Wire, and Second Dummy Wire>

Each of the first electrode wire 35, the first non-connecting wire 50, the first dummy wire 53, the second electrode wire 43, the second non-connecting wire 55, and the second dummy wire 60 described above has electric conductivity, and is formed of, for example, a thin metallic wire as described above. The thin metallic wire is made of, for example, a metal or an alloy, and can be made of copper, aluminum, silver, or an alloy thereof. From the viewpoint of a resistance value, the thin metallic wire preferably contains copper or silver. In addition, the thin metallic wire may contain metallic particles and a binder, for example, metallic silver and a polymer binder such as gelatin or acrylic styrene-based latex.

The thin metallic wire is not limited to the above-described wire made of a metal or an alloy, and may contain, for example, any one of metal oxide particles, a metal paste such as a silver paste or a copper paste, and metal nanowire particles such as silver nanowire or copper nanowire.

In addition, the thin metallic wire may have a single layer structure or a multilayer structure. The thin metallic wire may have, for example, a structure in which a copper oxynitride layer, a copper layer, and a copper oxynitride layer are laminated in order, or a structure in which molybdenum (Mo), aluminum (Al), and molybdenum (Mo) are laminated in order.

In order to reduce the reflectivity of the thin metallic wire, a surface of the thin metallic wire may be subjected to a blackening treatment through a sulfurizing treatment or an oxidizing treatment. Furthermore, a blackened layer may be provided to make the thin metallic wire hard to view. The blackened layer reduces, for example, the reflectivity of the thin metallic wire. The blackened layer can be made of copper nitride, copper oxide, copper oxynitride, AgO, Pd, carbon, or other nitride or oxide. The blackened layer is disposed on the visual recognition side of the thin metallic wire, that is, on the touch face side.

Next, a method of manufacturing the first electrode wire 35, the first non-connecting wire 50, the first dummy wire 53, the second electrode wire 43, the second non-connecting wire 55, and the second dummy wire 60 described above will be described.

<Manufacturing Method>

The method of manufacturing the first electrode wire 35, the first non-connecting wire 50, the first dummy wire 53, the second electrode wire 43, the second non-connecting wire 55, and the second dummy wire 60 described above is not particularly limited as long as wire formation is possible on the transparent insulating base 30 or the like. A plating method described in JP2014-159620A or JP2012-144761A, a silver salt method described in JP2012-6377A, JP2014-112512A, JP2014-209332A, JP2015-22397A, JP2016-192200A, or WO2016/157585A, a vapor deposition method described in JP2014-29614A, a printing method using a conductive ink described in JP2011-28985A, or the like can be properly used.

<First Peripheral Wiring Portion and Second Peripheral Wiring Portion>

The wire widths (line) of the first peripheral wire 37 and the second peripheral wire 45 respectively formed in the first peripheral wiring portion 38 and the second peripheral wiring portion 46 are preferably 50 µm or less, more preferably 30 µm or less, and particularly preferably 15 µm or less. The interval (space) between the first peripheral wires 37 and the interval (space) between the second peripheral wires 45 are preferably 50 µm or less, more preferably 30 µm or less, and particularly preferably 15 µm or less. Since the areas of the first peripheral wiring portion 38 and the second peripheral wiring portion 46 can be reduced, it is preferable that the wire width and the interval be within the above-described ranges, respectively.

The first peripheral wire 37 and the second peripheral wire 45 can also be formed by the above-described wire manufacturing method. The first peripheral wire 37 and the first electrode 34 can be simultaneously formed with the same material through the same process. In addition, the second peripheral wire 45 and the second electrode 42 can be simultaneously formed with the same material through the same process.

<Transparent Insulating Base>

The kind of the transparent insulating bases 30 and 31 is not particularly limited as long as the first electrode layer 32 and the second electrode layer 40 can be provided. Examples of the material of the transparent insulating bases 30 and 31 include a transparent resin material and a transparent inorganic material.

Specific examples of the transparent resin material include acetyl cellulose-based resins such as triacetyl cellulose, polyester-based resins such as polyethylene terephthalate (PET) and polyethylene naphthalate (PEN), olefin-based resins such as polyethylene (PE), polymethylpentene, cycloolefin polymer (COP), and cycloolefin copolymer (COC), acryl-based resins such as polymethyl methacrylate, polyether sulfone, polycarbonate, polysulfone, polyether, polyether ketone, acrylonitrile, and methacrylonitrile. The thickness of the transparent resin material is preferably 20 to 200 µm.

Specific examples of the transparent inorganic material include glass such as alkali-free glass, alkali glass, chemically reinforced glass, soda glass, potash glass, and lead glass, ceramics such as translucent piezoelectric ceramics (lanthanum lead titanate zirconate (PLZT)), quartz, fluorite, and sapphire. The thickness of the transparent inorganic material is preferably 0.1 to 1.3 mm.

A preferable aspect of the transparent insulating bases 30 and 31 is a treated substrate subjected to at least one selected from the group consisting of an atmospheric-pressure plasma treatment, a corona discharge treatment, and an ultraviolet irradiation treatment. By performing the above-described treatment, a hydrophilic group such as an OH group is introduced to the surface of the treated transparent insulating base 30, and thus adhesion between the first and second electrode layers 32 and 40 and the transparent insulating bases 30 and 31 is further improved. Among the above-described treatments, an atmospheric-pressure plasma treatment is preferable in view of a further improvement in the adhesion between the first and second electrode layers 32 and 40 and the transparent insulating bases 30 and 31.

As another preferable aspect of the transparent insulating bases 30 and 31, an underlayer containing a polymer is preferably provided on the surface on which the first electrode layer 32 and the second electrode layer 40 are provided. The adhesion between the first and second electrode layers 32 and 40 and the transparent insulating base 30 is further improved by forming the first electrode layer 32 and the second electrode layer 40 on the underlayer.

The method of forming an underlayer is not particularly limited, and examples thereof include a method including: applying an underlayer forming composition containing a polymer to a substrate; and performing a heating treatment as necessary. The underlayer forming composition may contain a solvent as necessary. The kind of the solvent is not particularly limited. As the underlayer forming composition containing a polymer, gelatin, an acrylic resin, a urethane resin, or acrylic styrene-based latex containing inorganic or polymer fine particles may be used.

The thickness of the underlayer is not particularly limited. In view of more excellent adhesion between the first and second electrode layers 32 and 40 and the transparent insulating base 30, the thickness is preferably 0.02 to 2.0 µm, and more preferably 0.03 to 1.5 µm.

Other than the above-described underlayer, for example, an ultraviolet absorbing layer may be provided as necessary as another layer between the transparent insulating base 30 and the first electrode layer 32 or the second electrode layer 40.

The following functional films may be further formed as necessary.

<Protective Layer>

A transparent protective layer may be formed on the first electrode wires 35 and the second electrode wires 43. An organic film such as gelatin, an acrylic resin, a urethane resin, or acrylic styrene-based latex, or an inorganic film such as silicon dioxide can be used as the protective layer, and the film thickness is preferably 10 nm to 10,000 nm.

A transparent coat layer may be formed on the protective layer as necessary. An organic film such as an acrylic resin or a urethane resin is used as the transparent coat layer. The transparent coat layer is formed in the sensing region 48, and the film thickness is 1 µm to 100 µm.

<Peripheral Wiring Insulating Film>

A peripheral wiring insulating film may be formed on the first peripheral wires 37 and the second peripheral wires 45 illustrated in FIG. 2 in order to prevent migration and corrosion of the peripheral wires. An organic film such as an acrylic resin or a urethane resin is used as the peripheral wiring insulating film, and the film thickness is preferably 1 µm to 30 µm. The peripheral wiring insulating film may be formed only on the first peripheral wires 37 or the second peripheral wires 45.

Basically, the invention is constituted as above. The touch panel and the conductive sheet for a touch panel according to the invention have been described in detail, but the invention is not limited to the above-described embodiments. Needless to say, various modifications or changes may be made without departing from the gist of the invention. For example, the conductive sheet according to the invention may have a film form.

EXAMPLES

Hereinafter, characteristics of the invention will be described in more detail with examples. The materials, reagents, amounts, substance amounts, ratios, treatment contents, treatment procedures, and the like shown in the following examples can be properly changed without departing from the intent of the invention. Accordingly, the scope of the invention is not restrictively interpreted by the following specific examples.

In the examples, the electrode pattern and the size of a first electrode layer and a second electrode layer were changed in relation to a touch panel configuration to produce the following Examples 1 to 10, 11 to 13, and 21 to 24, and Comparative Examples 1, 2, 11, 12, 21, and 22, and sensitivity, visibility, and moire were evaluated for each of the examples.

Regarding Examples 1 to 10, 11 to 13, and 21 to 24, and Comparative Examples 1, 2, 11, 12, 21, and 22, the electrode pattern and the size of the first electrode layer and the second electrode layer are shown in the following Table 1. In Table 1, the "electrode width ratio" refers to a ratio (W1/W2) of an electrode width W1 of a first electrode to an electrode width W2 of a second electrode. The following Table 1 further shows evaluation results of sensitivity, visibility, and moire. In the examples, a touch panel 16 having the configuration illustrated in FIG. 1 was used as a touch panel.

Hereinafter, Examples 1 to 10, 11 to 13, and 21 to 24, and Comparative Examples 1, 2, 11, 12, 21, and 22 will be described.

In Examples 1 to 10, the first electrode layer had a configuration illustrated in FIG. 5 and the second electrode layer had a configuration illustrated in FIG. 6. A combination of the first electrode layer illustrated in FIG. 5 and the second electrode layer illustrated in FIG. 6 is referred to as a first pattern.

In Example 11, the first electrode layer had a configuration illustrated in FIG. 9 and the second electrode layer had a configuration illustrated in FIG. 10. A combination of the first electrode layer illustrated in FIG. 9 and the second electrode layer illustrated in FIG. 10 is referred to as a second pattern.

In Example 12, the first electrode layer had a configuration illustrated in FIG. 12 and the second electrode layer had a configuration illustrated in FIG. 13. A combination of the first electrode layer illustrated in FIG. 12 and the second electrode layer illustrated in FIG. 13 is referred to as a third pattern.

In Example 13, the first electrode layer had a configuration illustrated in FIG. 15 and the second electrode layer had a configuration illustrated in FIG. 16. A combination of the first electrode layer illustrated in FIG. 15 and the second electrode layer illustrated in FIG. 16 is referred to as a fourth pattern.

In Example 21, the first electrode layer had a configuration illustrated in FIG. 18 and the second electrode layer had a configuration illustrated in FIG. 19. A combination of the first electrode layer illustrated in FIG. 18 and the second electrode layer illustrated in FIG. 19 is referred to as a fifth pattern.

In Example 22, the first electrode layer had a configuration illustrated in FIG. 21 and the second electrode layer had a configuration illustrated in FIG. 22. A combination of the first electrode layer illustrated in FIG. 21 and the second electrode layer illustrated in FIG. 22 is referred to as a sixth pattern.

In Examples 23 and 24, the first electrode layer had a configuration illustrated in FIG. 24 and the second electrode layer had a configuration illustrated in FIG. 25. A combination of the first electrode layer illustrated in FIG. 24 and the second electrode layer illustrated in FIG. 25 is referred to as a seventh pattern.

In Comparative Example 1, the first electrode layer had a configuration illustrated in FIG. 36 and the second electrode layer had a configuration illustrated in FIG. 37. A combination of the first electrode layer illustrated in FIG. 36 and the second electrode layer illustrated in FIG. 37 is referred to as an eleventh pattern.

In Comparative Example 2, the first pattern is provided.

Figure 27:
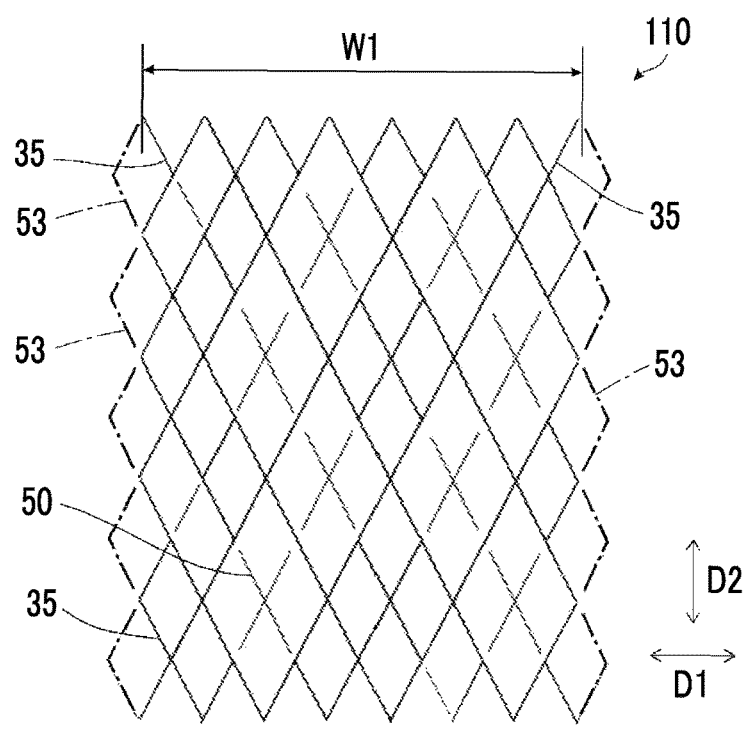
FIG. 27 is a view schematically illustrating a first example of a first electrode of a comparative example.
Figure 28:
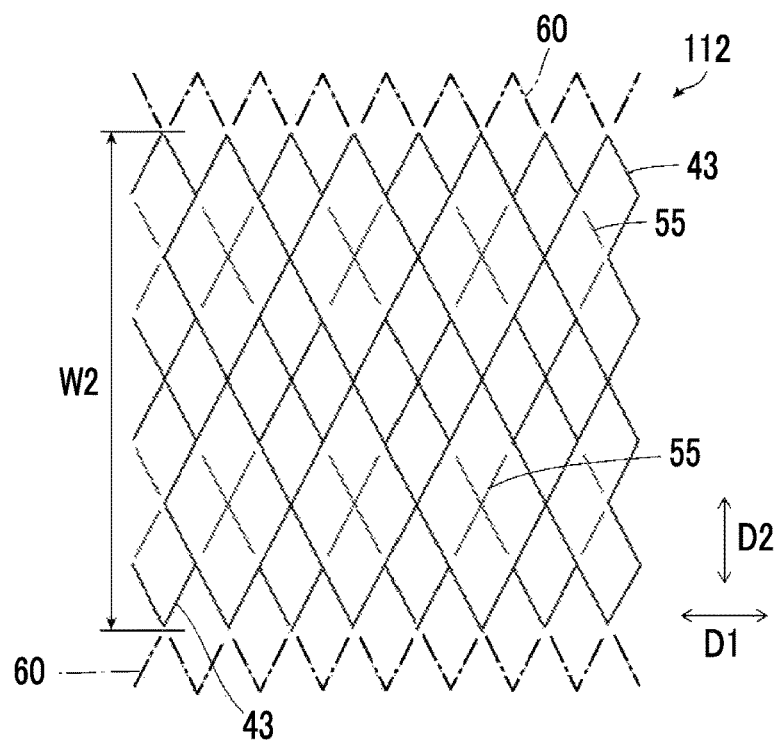
FIG. 28 is a view schematically illustrating a first example of a second electrode of the comparative example.

In Comparative Example 11, the first electrode layer had a configuration illustrated in FIG. 27 and the second electrode layer had a configuration illustrated in FIG. 28. A combination of the first electrode layer illustrated in FIG. 27 and the second electrode layer illustrated in FIG. 28 is referred to as an eighth pattern.

Figure 29:
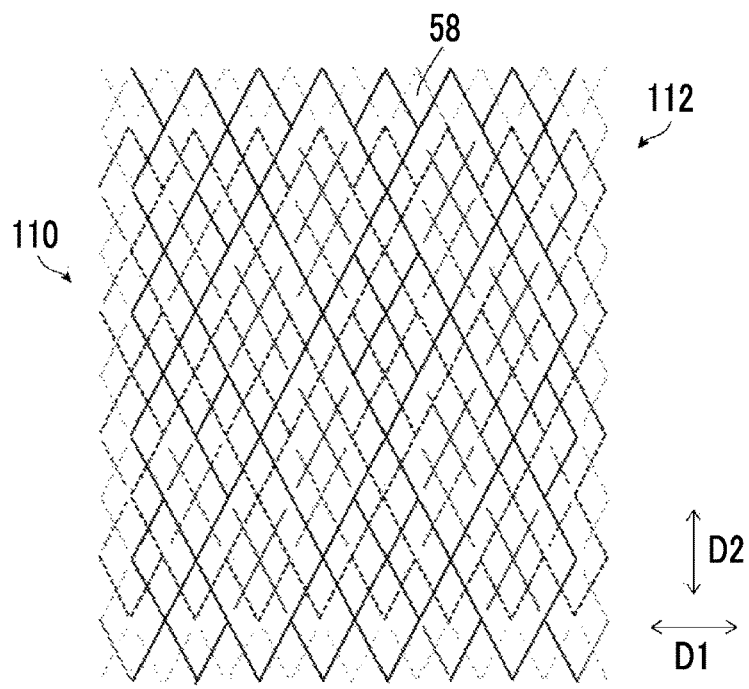
FIG. 29 is a view schematically illustrating a state in which the first example of the first electrode and the first example of the second electrode of the comparative example are overlapped.

Here, FIG. 27 is a view schematically illustrating a first example of the first electrode of the comparative example. FIG. 28 is a view schematically illustrating a first example of the second electrode of the comparative example. FIG. 29 is a view schematically illustrating a state in which the first example of the first electrode and the first example of the second electrode of the comparative example are overlapped. As illustrated in FIG. 29, lattices 58 are formed to form a mesh shape in a state in which the first electrode 110 and the second electrode 112 are overlapped.

In FIGS. 27 to 29, the same constituent parts as those in the configurations illustrated in FIGS. 9 to 11 will be denoted by the same references, and detailed description thereof will be omitted. FIGS. 27 to 29 illustrate only an intersection portion 59 (see FIG. 2) in which the first electrode 110 and the second electrode 112 are overlapped.

The first electrode 110 illustrated in FIG. 27 has the same configuration as the first electrode 34 illustrated in FIG. 9, except that the number of first non-connecting wires 50 is smaller than in the first electrode 34 illustrated in FIG. 9. The second electrode 112 illustrated in FIG. 28 has the same configuration as the second electrode 42 illustrated in FIG. 10.

Figure 30:
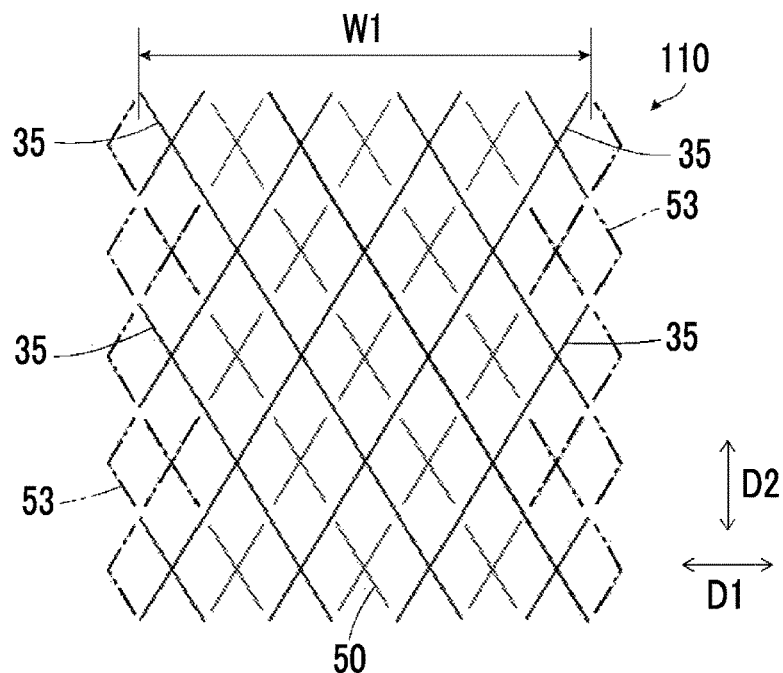
FIG. 30 is a view schematically illustrating a second example of the first electrode of the comparative example.
Figure 31:
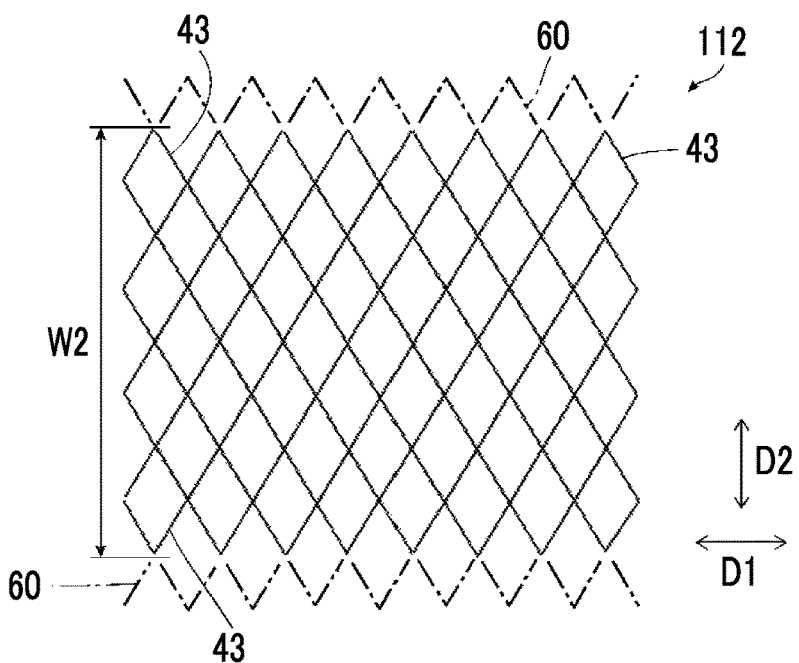
FIG. 31 is a view schematically illustrating a second example of the second electrode of the comparative example.

In Comparative Example 12, the first electrode layer had a configuration illustrated in FIG. 30 and the second electrode layer had a configuration illustrated in FIG. 31. A combination of the first electrode layer illustrated in FIG. 30 and the second electrode layer illustrated in FIG. 31 is referred to as a ninth pattern.

Figure 32:
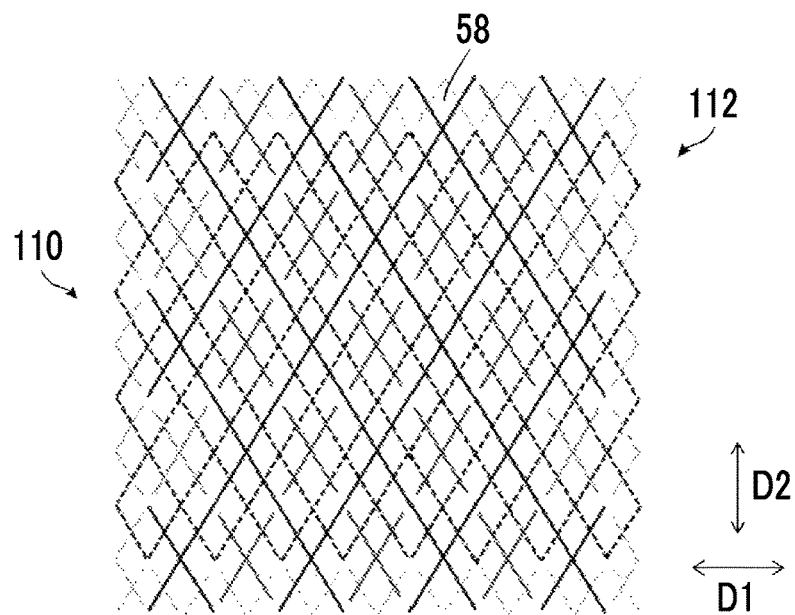
FIG. 32 is a view schematically illustrating a state in which the second example of the first electrode and the second example of the second electrode of the comparative example are overlapped.

Here, FIG. 30 is a view schematically illustrating a second example of the first electrode of the comparative example. FIG. 31 is a view schematically illustrating a second example of the second electrode of the comparative example. FIG. 32 is a view schematically illustrating a state in which the second example of the first electrode and the second example of the second electrode of the comparative example are overlapped. As illustrated in FIG. 32, lattices 58 are formed to form a mesh shape in a state in which the first electrode 110 and the second electrode 112 are overlapped.

In FIGS. 30 to 32, the same constituent parts as those in the configurations illustrated in FIGS. 9 to 11 will be denoted by the same references, and detailed description thereof will be omitted. FIGS. 30 to 32 illustrate only an intersection portion 59 (see FIG. 2) in which the first electrode 110 and the second electrode 112 are overlapped.

The first electrode 110 illustrated in FIG. 30 has the same configuration as the first electrode 34 illustrated in FIG. 9.

The second electrode 112 illustrated in FIG. 31 is different from the second electrode 42 illustrated in FIG. 10 in that no second non-connecting wires 55 are provided and second electrode wires 43 are provided at positions corresponding to the second non-connecting wires 55, and all other configurations thereof are the same as those of the second electrode 42 illustrated in FIG. 10.

Figure 33:
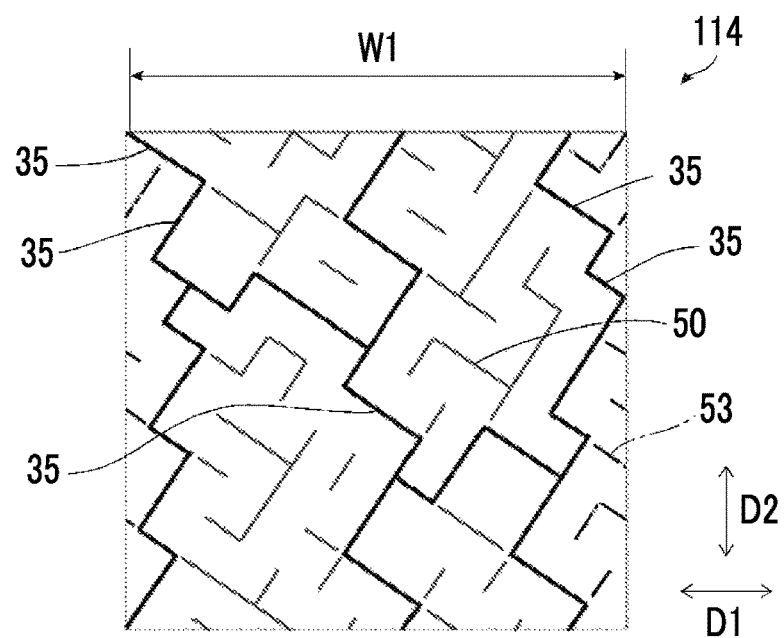
FIG. 33 is a view schematically illustrating a third example of the first electrode of the comparative example.
Figure 34:
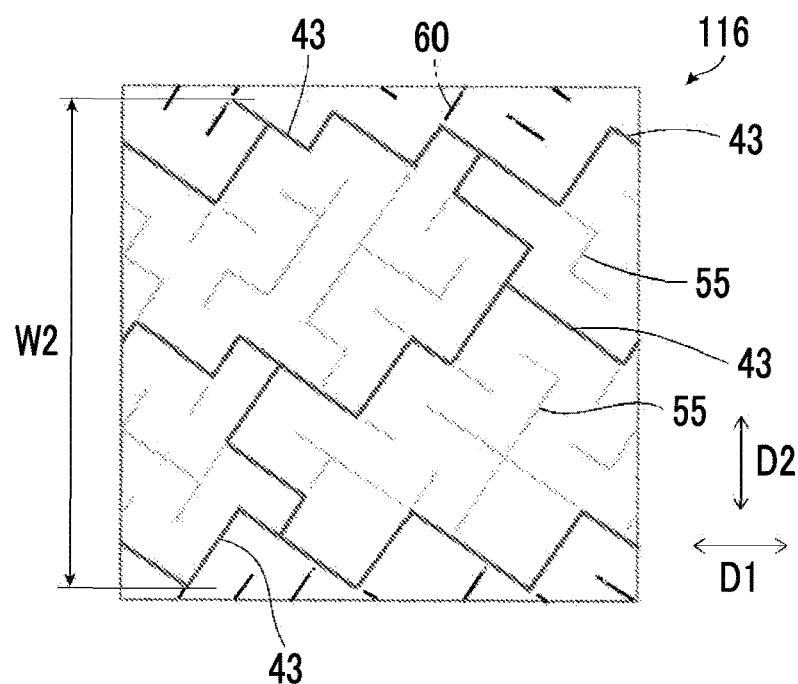
FIG. 34 is a view schematically illustrating a third example of the second electrode of the comparative example.

In Comparative Example 21, the first electrode layer had a configuration illustrated in FIG. 33 and the second electrode layer had a configuration illustrated in FIG. 34. A combination of the first electrode layer illustrated in FIG. 33 and the second electrode layer illustrated in FIG. 34 is referred to as a tenth pattern.

Figure 35:
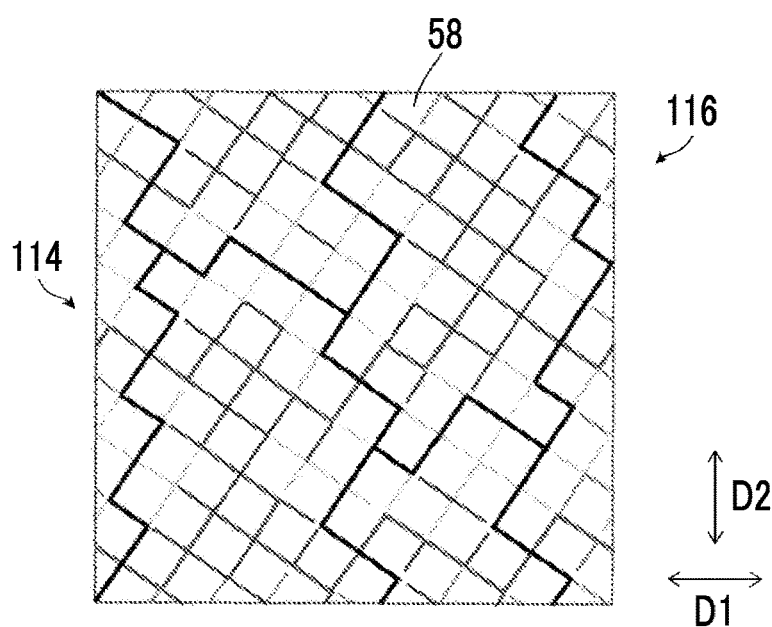
FIG. 35 is a view schematically illustrating a state in which the third example of the first electrode and the third example of the second electrode of the comparative example are overlapped.

Here, FIG. 33 is a view schematically illustrating a third example of the first electrode of the comparative example. FIG. 34 is a view schematically illustrating a third example of the second electrode of the comparative example. FIG. 35 is a view schematically illustrating a state in which the third example of the first electrode and the third example of the second electrode of the comparative example are overlapped. As illustrated in FIG. 35, lattices 58 are formed to form a mesh shape in a state in which the first electrode 114 and the second electrode 116 are overlapped.

In FIGS. 33 to 35, the same constituent parts as those in the configurations illustrated in FIGS. 18 to 20 will be denoted by the same references, and detailed description thereof will be omitted. FIGS. 33 to 35 illustrate only an intersection portion 59 (see FIG. 2) in which the first electrode 114 and the second electrode 116 are overlapped. In FIGS. 33 to 35, the line thickness is changed for the sake of illustration, but the line thickness has no relation with the actual thickness.

The first electrode 114 illustrated in FIG. 33 is different from the first electrode 34 illustrated in FIG. 18 in terms of the configuration of a first electrode wire 35 at the center in a first direction D1 and the pattern of a first electrode wire 35 electrically connecting a plurality of first electrode wires 35 extending in a second direction D2 to each other, and in that a larger number of first non-connecting wires 50 is disposed, and all other configurations thereof are the same as those of the first electrode 34 illustrated in FIG. 18.

The second electrode 116 illustrated in FIG. 34 is different from the second electrode 42 illustrated in FIG. 19 in that a larger number of second non-connecting wires 55 is provided, and all other configurations thereof are the same as those of the second electrode 42 illustrated in FIG. 19.

In Comparative Example 22, the first electrode layer had a configuration illustrated in FIG. 34 and the second electrode layer had a configuration illustrated in FIG. 33. A combination of the first electrode layer illustrated in FIG. 34 and the second electrode layer illustrated in FIG. 33 is referred to as a tenth pattern (reverse).

In the following Table 1, in the field of "electrode wire pattern", "bent wire" was entered in a case where the electrode wires had a bent shape, and "mesh" was entered in a case where the electrode wires formed a mesh shape. In addition, "special" was entered in a case where the shape of the electrode wires was complicated and could not be classified as either the bent shape or the mesh shape.

In Examples 1 to 5 and Comparative Examples 1 and 2, all wires had a wire width of 6 μm.

In Examples 6 to 10, 11 to 13, 21 to 24 and Comparative Examples 11, 12, 21, and 22, any wire had a wire width of 3 μm.

In the configuration of the touch panel, reinforced glass having a thickness of 0.4 mm was used as a cover layer. An optically transparent pressure sensitive adhesive (optical clear adhesive, OCA, 8146-4 (product No.) manufactured by 3M, thickness: 75 μm) was used as a transparent layer between the cover layer and the conductive sheet for a touch panel.

The first electrode layer was configured using wires having a lamination structure of a copper oxynitride layer having a thickness of 38 nm, a copper layer having a thickness of 500 nm, and a copper oxynitride layer having a thickness of 38 nm.

The second electrode layer was configured using wires having a lamination structure of a copper oxynitride layer having a thickness of 38 nm, a copper layer having a thickness of 500 nm, and a copper oxynitride layer having a thickness of 38 nm.

A cycloolefin polymer (COP) base having a thickness of 50 μm was used as a transparent insulating base.

A method of manufacturing the touch panel will be described.

A cycloolefin polymer base (hereinafter, simply referred to as a base) having a thickness of 50 μm was prepared as a transparent insulating base. An underlayer formed of an acrylic resin having a thickness of 1.2 μm was formed using a coating liquid on a first surface and a second surface of the base.

On the underlayer of the first surface of the base, a lower copper oxynitride layer having a thickness of 38 nm was formed using a sputtering method. Next, a copper layer having a thickness of 500 nm was formed using a sputtering method on the lower copper oxynitride layer. Furthermore, an upper copper oxynitride layer having a thickness of 38 nm was formed using a sputtering method on the copper layer to form a first conductive layer formed of the copper oxynitride layer, the copper layer, and the copper oxynitride layer.

Similarly to the first conductive layer, a lower copper oxynitride layer having a thickness of 38 nm was formed using a sputtering method on the underlayer of the second surface of the base. Next, a copper layer having a thickness of 500 nm was formed using a sputtering method on the lower copper oxynitride layer. Furthermore, an upper copper oxynitride layer having a thickness of 38 nm was formed using a sputtering method on the copper layer to form a second conductive layer formed of the copper oxynitride layer, the copper layer, and the copper oxynitride layer, and a conductive laminate for a touch panel was formed.

Next, a resist was applied to both of the first conductive layer and the second conductive layer of the conductive laminate for a touch panel, exposure was performed via an exposure mask from the both surfaces of the conductive laminate for a touch panel, and development was performed to form a resist pattern having an electrode pattern and a peripheral wiring pattern on both surfaces.

Next, using a ferric chloride solution as an etching solution, the first and second conductive layers, each formed of the copper oxynitride layer, the copper layer, and the copper oxynitride layer, were etched. The resist was peeled using a peeling solution to form a first electrode layer and a second electrode layer, and a conductive sheet for a touch panel was produced.

Using any one of the above-described first to eleventh patterns and tenth pattern (reverse) as the pattern of the exposure mask, various patterns of electrode wires and non-connecting wires of first and second electrodes were produced.

The produced conductive sheet for a touch panel and a cover layer were bonded to each other using the above-described optically transparent pressure sensitive adhesive. The resulting product was connected to a controller, and a touch panel was produced.

Sensitivity was evaluated as follows.

Using a probe robot, a stylus pen having a tip end diameter of 2 mm was brought into contact with 10,000 positions previously set on a surface of the touch panel in order, and each touch position was detected. Results of the detection of the 10,000 positions and set values corresponding thereto were compared. Using a 9973-th value from a minimum absolute value of a differential vector between the detected position and the set position, sensitivity was evaluated based on the following evaluation standards.

"A": The above-described 9973-th value is less than 1.0 mm

"B": The above-described 9973-th value is 1.0 mm to less than 2.0 mm.

"C": The above-described 9973-th value is 2.0 mm or greater.

The evaluation level "C" is a level at which erroneous detection frequently occurs with a stylus pen having a tip end diameter of 2 mm, and thus a problem occurs in practical use. The evaluation level "B" is a level at which no problem occurs in practical use with less erroneous detection. The evaluation level "A" is a very excellent level with no erroneous detection.

Visibility is evaluated as follows.

Regarding visibility, a subject observed the touch panel from a position separated therefrom by a distance of 30 cm, and evaluated visibility of thin metallic wires. The visibility evaluation standards are as follows. 20 evaluators participated in the determination with regard to the visibility.

"A": None of 20 people could visually recognize the thin metallic wires.

"B": 1 to 4 of 20 people could visually recognize the thin metallic wires.

"C": 5 to less than 10 of 20 people could visually recognize the thin metallic wires.

"D": 10 or more of 20 people could visually recognize the thin metallic wires.

The evaluation level "D" is a level at which a problem occurs in practical use. No problem occurs in practical use at the evaluation level "C" or higher. The evaluation level "B" is an excellent level, and the evaluation level "A" is a very excellent level.

Moire is evaluated as follows.

Regarding moire, the touch panel was disposed on a liquid crystal display module, and in a state in which the liquid crystal display module was lighted green, the touch panel was observed to evaluate whether moire was visually recognized in the touch panel. The moire evaluation standards are as follows. 20 evaluators participated in the determination with regard to the moire.

"A": None of 20 people could visually recognize moire.

"B": 1 to 4 of 20 people could visually recognize moire.

"C": 5 to less than 10 of 20 people could visually recognize moire.

"D": 10 or more of 20 people could visually recognize moire.

The evaluation level "D" is a level at which a problem occurs in practical use. No problem occurs in practical use at the evaluation level "C" or higher. The evaluation level "B" is an excellent level, and the evaluation level "A" is a very excellent level.

TABLE 1

| | Electrode Wire Pattern | Electrode Pattern | Wire Width | C1 | C2 | C1/C2 | $((A1 + B1)/E1)/$ $((A2 + B2)/E2)$ | Electrode Width Ratio | Sensitivity | Visibility | Moire |
|---|---|---|---|---|---|---|---|---|---|---|---|
| Example 1 | Bent Wire | First Pattern | 6 μm | 0.57 | 0.43 | 1.33 | 1.00 | 1.00 | A | B | B |
| Example 2 | Bent Wire | First Pattern | 6 μm | 0.71 | 0.43 | 1.67 | 1.00 | 1.00 | A | B | B |
| Example 3 | Bent Wire | First Pattern | 6 μm | 0.63 | 0.50 | 1.25 | 1.00 | 1.00 | A | B | B |
| Example 4 | Bent Wire | First Pattern | 6 μm | 0.75 | 0.50 | 1.50 | 1.00 | 1.00 | A | B | B |
| Example 5 | Bent Wire | First Pattern | 6 μm | 0.60 | 0.50 | 1.20 | 2.50 | 0.83 | A | C | C |
| Example 6 | Bent Wire | First Pattern | 3 μm | 0.55 | 0.50 | 1.10 | 1.00 | 1.00 | B | A | B |
| Example 8 | Bent Wire | First Pattern | 3 μm | 0.45 | 0.40 | 1.13 | 1.00 | 1.00 | B | A | B |
| Example 7 | Bent Wire | First Pattern | 3 μm | 0.80 | 0.40 | 2.00 | 1.00 | 1.00 | A | A | B |
| Example 9 | Bent Wire | First Pattern | 3 μm | 0.85 | 0.40 | 2.13 | 1.00 | 1.00 | B | A | B |
| Example 10 | Bent Wire | First Pattern | 3 μm | 0.60 | 0.20 | 3.00 | 1.00 | 1.00 | B | A | B |
| Comparative Example 1 | Bent Wire | Eleventh Pattern | 6 μm | 0.43 | 0.43 | 1.00 | 1.00 | 1.00 | C | B | B |
| Comparative Example 2 | Bent Wire | First Pattern | 6 μm | 0.29 | 0.43 | 0.67 | 1.00 | 1.00 | C | B | B |
| Example 11 | Mesh | Second Pattern | 3 μm | 0.39 | 0.25 | 1.55 | 1.05 | 1.00 | A | A | A |
| Example 12 | Mesh | Third Pattern | 3 μm | 0.38 | 0.28 | 1.50 | 1.09 | 1.00 | A | A | A |
| Example 13 | Mesh | Fourth Pattern | 3 μm | 0.60 | 0.33 | 1.83 | 1.09 | 1.00 | A | A | A |

TABLE 1-continued

| | Electrode Wire Pattern | Electrode Pattern | Wire Width | C1 | C2 | C1/C2 | ((A1 + B1)/E1)/ ((A2 + B2)/E2) | Electrode Width Ratio | Sensitivity | Visibility | Moire |
|---|---|---|---|---|---|---|---|---|---|---|---|
| Comparative Example 11 | Mesh | Eighth Pattern | 3 μm | 0.25 | 0.25 | 1.00 | 1.09 | 1.00 | C | A | A |
| Comparative Example 12 | Mesh | Ninth Pattern | 3 μm | 0.39 | 0.00 | — | 1.05 | 1.00 | C | A | A |
| Example 21 | Special | Fifth Pattern | 3 μm | 0.51 | 0.34 | 1.50 | 1.00 | 1.05 | A | A | A |
| Example 22 | Special | Sixth Pattern | 3 μm | 0.57 | 0.45 | 1.25 | 1.00 | 1.07 | A | A | A |
| Example 23 | Special | Seventh Pattern | 3 μm | 0.63 | 0.45 | 1.40 | 1.00 | 1.07 | A | A | A |
| Example 24 | Special | Seventh Pattern | 3 μm | 0.43 | 0.35 | 1.22 | 1.22 | 1.05 | A | B | A |
| Comparative Example 21 | Special | Tenth Pattern | 3 μm | 0.49 | 0.49 | 1.00 | 1.00 | 1.05 | C | A | A |
| Comparative Example 22 | Special | Tenth Pattern (reverse) | 3 μm | 0.34 | 0.51 | 0.67 | 1.00 | 0.95 | C | A | A |

As shown in Table 1, in Examples 1 to 10 and Comparative Examples 1 and 2 in which the electrode wire pattern was a bent wire pattern, the sensitivity evaluation results were better in Examples 1 to 10 than in Comparative Examples 1 and 2. In addition, in Examples 1 to 4 and 6 to 10, the value of $((A1+B1)/E1)/((A2+B2)/E2)$ was within the preferable range, and good results were obtained in the visibility evaluation and in the moire evaluation. In Example 5, the value of $((A1+B1)/E1)/((A2+B2)/E2)$ was out of the preferable range, and the results of the visibility evaluation and the moire evaluation deteriorated.

In Examples 11 to 13 and Comparative Examples 11 and 12 in which the electrode wires formed a mesh shape, the sensitivity evaluation results were better in Examples 11 to 13 than in Comparative Examples 11 and 12. In addition, in Examples 11 to 13, the value of $((A1+B1)/E1)/((A2+B2)/E2)$ was within the preferable range, and good results were obtained in the visibility evaluation and in the moire evaluation.

In Examples 21 to 24 and Comparative Examples 21 and 22 in which the electrode wires had a complicated shape, the sensitivity evaluation results were better in Examples 21 to 24 than in Comparative Examples 21 and 22. In Examples 21 to 23, the value of $((A1+B1)/E1)/((A2+B2)/E2)$ was within the preferable range, and good results were obtained in the visibility evaluation and in the moire evaluation.

In Example 24, the value of $((A1+B1)/E1)/((A2+B2)/E2)$ was out of the preferable range, and the level "B" was obtained in the visibility evaluation.

Other aspects are as follows.

A conductive member including a first electrode layer and a second electrode layer, in which the first electrode layer and the second electrode layer are disposed to be opposed to each other in an insulated state, the first electrode layer is provided with a plurality of first electrodes that are disposed at intervals in a first direction and extend in a second direction perpendicular to the first direction, the first electrode has a plurality of first electrode wires, a first pad to which the plurality of first electrode wires are electrically connected, and a plurality of first non-connecting wires that are not electrically connected to the first electrode wires, the second electrode layer is provided with a plurality of second electrodes that are disposed at intervals in the second direction and extend in the first direction, the second electrode has a plurality of second electrode wires, a second pad to which the plurality of second electrode wires are electrically connected, and a plurality of second non-connecting wires that are not electrically connected to the second electrode wires, in a case where a total area of the first non-connecting wires in the first electrode is indicated by A1, a total area of the first electrode wires in the first electrode is indicated by B1, and an occupation ratio of the first non-connecting wires in the first electrode is indicated by C1, $C1=A1/(A1+B1)$ is satisfied, in a case where a total area of the second non-connecting wires in the second electrode is indicated by A2, a total area of the second electrode wires in the second electrode is indicated by B2, and an occupation ratio of the second non-connecting wires in the second electrode is indicated by C2, $C2=A2/(A2+B2)$ is satisfied, and at least one first electrode and at least one second electrode satisfying $C2<C1$ are provided.

EXPLANATION OF REFERENCES

10: conductive sheet for touch panel
12: cover layer
12a: front surface
13: touch sensor
14: controller
15: transparent layer
16: touch panel
18: transparent layer
20: display panel
30, 31: transparent insulating base
30a, 31a: front surface
30b, 31b: rear surface
30c: one side
32: first electrode layer
34: first electrode
35: first electrode wire
35a: linear portion
35b: bent portion
36: first pad
37: first peripheral wire
38: first peripheral wiring portion
39: terminal connection region
40: second electrode layer
42: second electrode
43: second electrode wire
44: second pad
45: second peripheral wire
46: second peripheral wiring portion
47: terminal connection region
48: sensing region
49: transparent adhesive layer
50: first non-connecting wire
53: first dummy wire
55: second non-connecting wire
58: lattice
59: intersection portion 60: second dummy wire
100: first electrode layer
102: first electrode
104: second electrode layer
106: second electrode
110: first electrode
112: second electrode
114: first electrode
116: second electrode
300: transparent insulating member
D1: first direction
D2: second direction
Dn: vertical direction
Lm: electrode length
Ln: electrode length
W1: electrode width
W2: electrode width
p: pitch
θ: angle

What is claimed is:

1. A touch panel comprising:
a transparent insulating member;
a first electrode layer that is positioned on a first surface of the transparent insulating member; and
a second electrode layer that is positioned on a second surface opposed to the first surface of the transparent insulating member,
wherein the first surface is on a contact detection side,
the first electrode layer is provided with a plurality of first electrodes that are disposed at intervals in a first direction and extend in a second direction perpendicular to the first direction,
the first electrode has a plurality of first electrode wires, a first pad to which the plurality of first electrode wires are electrically connected, and a plurality of first non-connecting wires that are not electrically connected to the first electrode wires,
the second electrode layer is provided with a plurality of second electrodes that are disposed at intervals in the second direction and extend in the first direction,
the second electrode has a plurality of second electrode wires, a second pad to which the plurality of second electrode wires are electrically connected, and a plurality of second non-connecting wires that are not electrically connected to the second electrode wires,
in a case where a total area of the first non-connecting wires in the first electrode is indicated by A1, a total area of the first electrode wires in the first electrode is indicated by B1, and an occupation ratio of the first non-connecting wires in the first electrode is indicated by C1, C1=A1/(A1+B1) is satisfied,
in a case where a total area of the second non-connecting wires in the second electrode is indicated by A2, a total area of the second electrode wires in the second electrode is indicated by B2, and an occupation ratio of the second non-connecting wires in the second electrode is indicated by C2, C2=A2/(A2+B2) is satisfied, and
at least one first electrode and at least one second electrode satisfying C2<C1 are provided.

2. The touch panel according to claim 1,
wherein in a sensing region where the first electrode layer and the second electrode layer of the transparent insulating member are provided, the occupation ratio C1 of the first non-connecting wires and the occupation ratio C2 of the second non-connecting wires satisfy C2<C1.

3. The touch panel according to claim 1,
wherein the occupation ratio C1 of the first non-connecting wires and the occupation ratio C2 of the second non-connecting wires satisfy 1.0<C1/C2≤3.0.

4. The touch panel according to claim 2,
wherein the occupation ratio C1 of the first non-connecting wires and the occupation ratio C2 of the second non-connecting wires satisfy 1.0<C1/C2≤3.0.

5. The touch panel according to claim 3,
wherein the occupation ratio C1 of the first non-connecting wires and the occupation ratio C2 of the second non-connecting wires satisfy 1.2≤C1/C2≤2.0.

6. The touch panel according to claim 4,
wherein the occupation ratio C1 of the first non-connecting wires and the occupation ratio C2 of the second non-connecting wires satisfy 1.2≤C1/C2≤2.0.

7. The touch panel according to claim 1,
wherein the first electrode and the second electrode have the same electrode width.

8. The touch panel according to claim 6,
wherein the first electrode and the second electrode have the same electrode width.

9. The touch panel according to claim 1,
wherein in a case where an area of the first electrode is indicated by E1 and an area of the second electrode is indicated by E2, the total area A1 of the first non-connecting wires, the total area B1 of the first electrode wires, the area E1 of the first electrode, the total area A2 of the second non-connecting wires, the total area B2 of the second electrode wires, and the area E2 of the second electrode satisfy 0.9<((A1+B1)/E1)/((A2+B2)/E2)<1.1.

10. The touch panel according to claim 2,
wherein in a case where an area of the first electrode is indicated by E1 and an area of the second electrode is indicated by E2, the total area A1 of the first non-connecting wires, the total area B1 of the first electrode wires, the area E1 of the first electrode, the total area A2 of the second non-connecting wires, the total area B2 of the second electrode wires, and the area E2 of the second electrode satisfy 0.9<((A1+B1)/E1)/((A2+B2)/E2)<1.1.

11. The touch panel according to claim 4,
wherein in a case where an area of the first electrode is indicated by E1 and an area of the second electrode is indicated by E2, the total area A1 of the first non-connecting wires, the total area B1 of the first electrode wires, the area E1 of the first electrode, the total area A2 of the second non-connecting wires, the total area B2 of the second electrode wires, and the area E2 of the second electrode satisfy 0.9<((A1+B1)/E1)/((A2+B2)/E2)<1.1.

12. The touch panel according to claim 6,
wherein in a case where an area of the first electrode is indicated by E1 and an area of the second electrode is indicated by E2, the total area A1 of the first non-connecting wires, the total area B1 of the first electrode wires, the area E1 of the first electrode, the total area A2 of the second non-connecting wires, the total area B2 of the second electrode wires, and the area E2 of the second electrode satisfy 0.9<((A1+B1)/E1)/((A2+B2)/E2)<1.1.

13. The touch panel according to claim 8,
wherein in a case where an area of the first electrode is indicated by E1 and an area of the second electrode is indicated by E2, the total area A1 of the first non-connecting wires, the total area B1 of the first electrode wires, the area E1 of the first electrode, the total area A2 of the second non-connecting wires, the total area B2 of the second electrode wires, and the area E2 of the second electrode satisfy $0.9 < ((A1+B1)/E1)/((A2+B2)/E2) < 1.1$.

14. The touch panel according to claim 1,
wherein the first electrode wire, the first non-connecting wire, the second electrode wire, and the second non-connecting wire have a wire width of 10 μm or less.

15. The touch panel according to claim 12,
wherein the first electrode wire, the first non-connecting wire, the second electrode wire, and the second non-connecting wire have the same wire width, and the wire width is 5 μm or less.

16. The touch panel according to claim 13,
wherein the first electrode wire, the first non-connecting wire, the second electrode wire, and the second non-connecting wire have the same wire width, and the wire width is 5 μm or less.

17. A conductive sheet for a touch panel comprising:
a transparent insulating member;
a first electrode layer that is positioned on a first surface of the transparent insulating member; and
a second electrode layer that is positioned on a second surface opposed to the first surface of the transparent insulating member,
wherein the first electrode layer is provided with a plurality of first electrodes that are disposed at intervals in a first direction and extend in a second direction perpendicular to the first direction,
the first electrode has a plurality of first electrode wires, a first pad to which the plurality of first electrode wires are electrically connected, and a plurality of first non-connecting wires that are not electrically connected to the first electrode wires,
the second electrode layer is provided with a plurality of second electrodes that are disposed at intervals in the second direction and extend in the first direction,
the second electrode has a plurality of second electrode wires, a second pad to which the plurality of second electrode wires are electrically connected, and a plurality of second non-connecting wires that are not electrically connected to the second electrode wires,
in a case where a total area of the first non-connecting wires in the first electrode is indicated by A1, a total area of the first electrode wires in the first electrode is indicated by B1, and an occupation ratio of the first non-connecting wires in the first electrode is indicated by C1, $C1=A1/(A1+B1)$ is satisfied,
in a case where a total area of the second non-connecting wires in the second electrode is indicated by A2, a total area of the second electrode wires in the second electrode is indicated by B2, and an occupation ratio of the second non-connecting wires in the second electrode is indicated by C2, $C2=A2/(A2+B2)$ is satisfied, and
at least one first electrode and at least one second electrode satisfying $C2<C1$ are provided.

18. A conductive sheet for a touch panel comprising:
a transparent insulating member;
a first electrode layer; and
a second electrode layer,
wherein the first electrode layer and the second electrode layer are opposed to each other with the transparent insulating member interposed therebetween,
the first electrode layer is provided with a plurality of first electrodes that are disposed at intervals in a first direction and extend in a second direction perpendicular to the first direction,
the first electrode has a plurality of first electrode wires, a first pad to which the plurality of first electrode wires are electrically connected, and a plurality of first non-connecting wires that are not electrically connected to the first electrode wires,
the second electrode layer is provided with a plurality of second electrodes that are disposed at intervals in the second direction and extend in the first direction,
the second electrode has a plurality of second electrode wires, a second pad to which the plurality of second electrode wires are electrically connected, and a plurality of second non-connecting wires that are not electrically connected to the second electrode wires,
in a case where a total area of the first non-connecting wires in the first electrode is indicated by A1, a total area of the first electrode wires in the first electrode is indicated by B1, and an occupation ratio of the first non-connecting wires in the first electrode is indicated by C1, $C1=A1/(A1+B1)$ is satisfied,
in a case where a total area of the second non-connecting wires in the second electrode is indicated by A2, a total area of the second electrode wires in the second electrode is indicated by B2, and an occupation ratio of the second non-connecting wires in the second electrode is indicated by C2, $C2=A2/(A2+B2)$ is satisfied, and
at least one first electrode and at least one second electrode satisfying $C2<C1$ are provided.

19. A touch sensor comprising:
the conductive sheet for a touch panel according to claim 17.

20. A touch sensor comprising:
the conductive sheet for a touch panel according to claim 18.

* * * * *